US009556973B2

(12) United States Patent
Rumsey et al.

(10) Patent No.: US 9,556,973 B2
(45) Date of Patent: Jan. 31, 2017

(54) SYSTEM SECURING A CABLE TO A ROOF

(71) Applicant: Hot Edge, LLC, Denver, CO (US)

(72) Inventors: Bronson Rumsey, Highlands Ranch, CO (US); Mike Riley, Glenwood Springs, CO (US); Andy Elson, Aurora, CO (US); Malcolm Brent Nark, Aurora, CO (US)

( * ) Notice: Subject to any disclaimer, the term of this patent is extended or adjusted under 35 U.S.C. 154(b) by 0 days.

(21) Appl. No.: 14/334,705

(22) Filed: Jul. 18, 2014

(65) Prior Publication Data

US 2014/0326837 A1 Nov. 6, 2014

Related U.S. Application Data

(63) Continuation-in-part of application No. 12/852,676, filed on Aug. 9, 2010, now Pat. No. 8,782,960, which is a continuation-in-part of application No. 12/765,140, filed on Apr. 22, 2010, now Pat. No. 8,490,336, which is a continuation-in-part of application No. 12/686,578, filed on Jan. 13, 2010, now Pat. No. 8,205,397, which is a continuation-in-part of application No. 12/547,227, filed on Aug. 25, 2009, now Pat. No. 8,191,319.

(51) Int. Cl.
*F16L 3/06* (2006.01)
*E04D 13/10* (2006.01)
*H05B 3/06* (2006.01)
*E04D 13/04* (2006.01)

(52) U.S. Cl.
CPC .............. *F16L 3/06* (2013.01); *E04D 13/103* (2013.01); *H05B 3/06* (2013.01); *E04D 2013/0418* (2013.01)

(58) Field of Classification Search
CPC .. E04D 13/103; E04D 13/106; E04D 13/0762; E04D 13/15; E04D 13/158; E04D 2013/0418; F16L 3/06; F16L 3/08; F16L 3/22; H05B 2214/02
USPC ........................................................ 219/213
See application file for complete search history.

(56) References Cited

U.S. PATENT DOCUMENTS 2,699,484 A 1/1955 Michaels
3,074,676 A 1/1963 Watson
(Continued)

FOREIGN PATENT DOCUMENTS

JP 2004100302 A 4/2004
WO WO8805988 A1 8/1988

OTHER PUBLICATIONS

Pentair Raychem Ice Stop brochure, 76 pages dated Mar. 2013.*

*Primary Examiner* — Robert Canfield
(74) *Attorney, Agent, or Firm* — Frank Marino

(57) ABSTRACT

A system for securing one or more heating cables to a roof and having one or more apparatuses, each apparatus including a metal base panel and a continuous metal C-shaped channel integrally-formed with the base panel. The channel includes a pair of opposing continuous channel walls creating and surrounding a continuous cavity having a cross-sectional cavity shape substantially identical for at least a majority thereof to the cross-sectional shape of the cable. The channel walls are resiliently flexible to enable receipt of a continuous length of the heating cable within the cavity such that the heating cable is in snug continuous contact with the channel to enhance heat conductance from the heating cable to the base panel.

8 Claims, 26 Drawing Sheets

(56) References Cited

U.S. PATENT DOCUMENTS

| | | | |
|---|---|---|---|
| 3,207,211 A | 9/1965 | Winterfeldt | |
| 3,241,271 A * | 3/1966 | Berg | E04D 13/1415 403/292 |
| 3,246,433 A * | 4/1966 | Eriksson | E04D 13/1415 403/292 |
| 3,297,815 A * | 1/1967 | Drettmann | H02G 3/286 174/135 |
| 3,501,873 A * | 3/1970 | Berg | E04D 13/15 52/11 |
| 3,521,029 A | 7/1970 | Toyooka et al. | |
| 4,189,881 A | 2/1980 | Hawley | |
| 4,445,301 A * | 5/1984 | Tanski | E04D 13/076 52/11 |
| 4,468,557 A | 8/1984 | Bylin et al. | |
| 4,492,355 A | 1/1985 | Bylin | |
| 4,624,087 A * | 11/1986 | Schneller | E04D 13/15 52/254 |
| 4,625,490 A * | 12/1986 | Baslow | B44C 7/022 160/327 |
| 4,848,051 A | 7/1989 | Weisner et al. | |
| 5,004,190 A | 4/1991 | Montierth et al. | |
| 5,170,597 A * | 12/1992 | Stearns | E04D 13/0459 52/11 |
| 5,294,780 A | 3/1994 | Montierth et al. | |
| 5,391,858 A | 2/1995 | Tourangeau et al. | |
| 5,496,005 A | 3/1996 | Dieringer | |
| 5,657,585 A * | 8/1997 | Zaccagni | E04D 13/158 52/518 |
| 5,829,206 A | 11/1998 | Bachman | |
| 5,836,344 A | 11/1998 | Hovi | |
| 6,098,344 A * | 8/2000 | Albracht | E04D 13/076 52/12 |
| 6,225,600 B1 | 5/2001 | Burris | |
| 6,499,259 B1 | 12/2002 | Hockman | |
| 6,668,491 B1 | 12/2003 | Bonerb | |
| 6,759,630 B1 | 7/2004 | Tenute | |
| 6,852,951 B2 | 2/2005 | Heise | |
| 7,071,446 B1 | 7/2006 | Bench | |
| 7,104,012 B1 | 9/2006 | Bayram | |
| 7,104,013 B1 | 9/2006 | Gates et al. | |
| 7,287,354 B2 | 10/2007 | Rivers et al. | |
| 7,448,167 B2 | 11/2008 | Bachman | |
| 7,681,363 B2 | 3/2010 | Banister | |
| 8,152,112 B2 * | 4/2012 | Miller | E04D 13/064 248/48.1 |
| 2001/0025839 A1 | 10/2001 | Jones | |
| 2002/0186562 A1 * | 12/2002 | Schroetter | F21V 21/088 362/249.01 |
| 2004/0100302 A1 | 5/2004 | Pitts | |
| 2004/0140002 A1 | 7/2004 | Brown et al. | |
| 2004/0257801 A1 * | 12/2004 | Cheema | F21V 33/006 362/152 |
| 2005/0139585 A1 | 6/2005 | Knappmiller | |
| 2006/0037252 A1 | 2/2006 | Gosse et al. | |
| 2006/0096968 A1 | 5/2006 | Livermore | |
| 2006/0196124 A1 * | 9/2006 | Bachman | E04D 13/076 52/12 |
| 2006/0213129 A1 | 9/2006 | Bachman | |
| 2006/0277831 A1 | 12/2006 | Bachman | |
| 2008/0196352 A1 | 8/2008 | Grove | |
| 2008/0302928 A1 | 12/2008 | Haddock | |
| 2010/0287849 A1 * | 11/2010 | Covone | E04D 13/15 52/94 |
| 2011/0047892 A1 | 3/2011 | Nark | |
| 2011/0047927 A1 | 3/2011 | Nark et al. | |
| 2011/0047930 A1 | 3/2011 | Nark | |
| 2011/0049118 A1 | 3/2011 | Nark | |
| 2011/0088335 A1 * | 4/2011 | Miller | E04D 13/158 52/97 |
| 2011/0209434 A1 | 9/2011 | Nark et al. | |
| 2011/0297662 A1 * | 12/2011 | Clark | E04D 13/103 219/213 |
| 2012/0067868 A1 | 3/2012 | Casey | |
| 2012/0091116 A1 | 4/2012 | Casey | |
| 2013/0319990 A1 * | 12/2013 | Casey | E04D 13/103 219/213 |

* cited by examiner

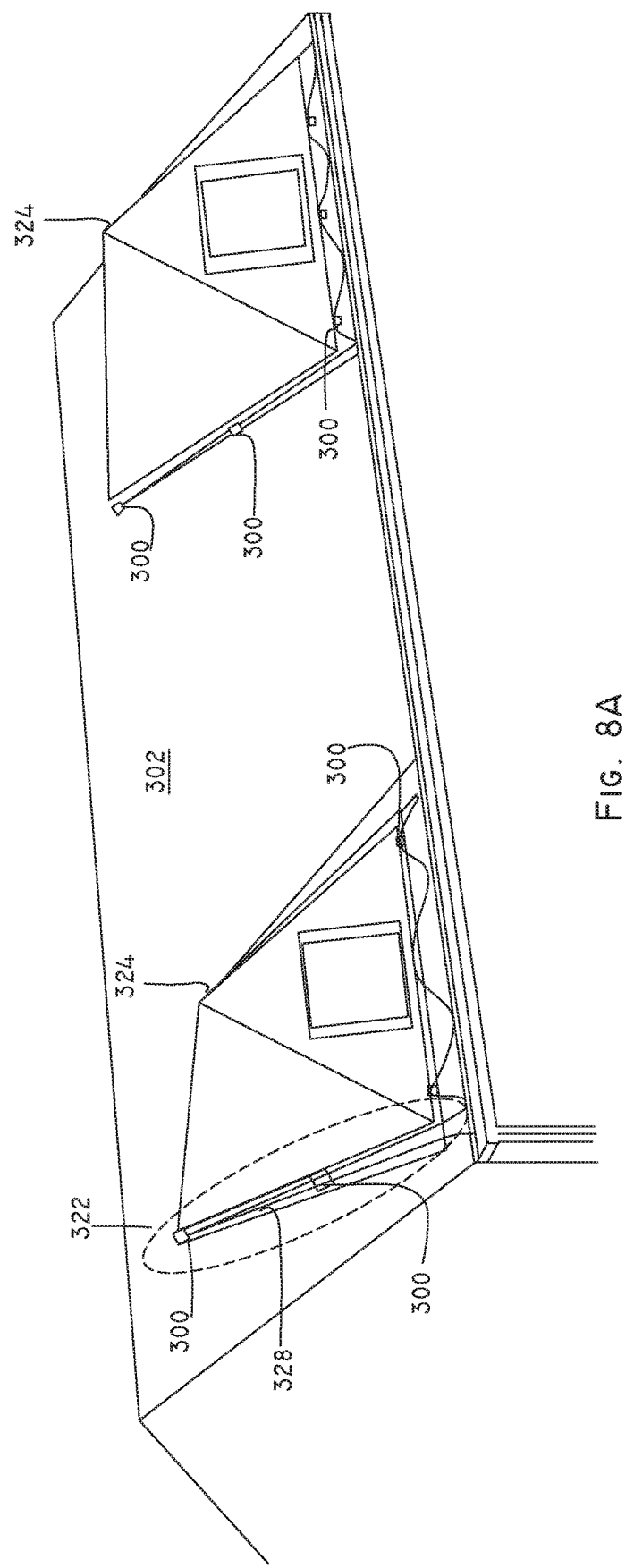

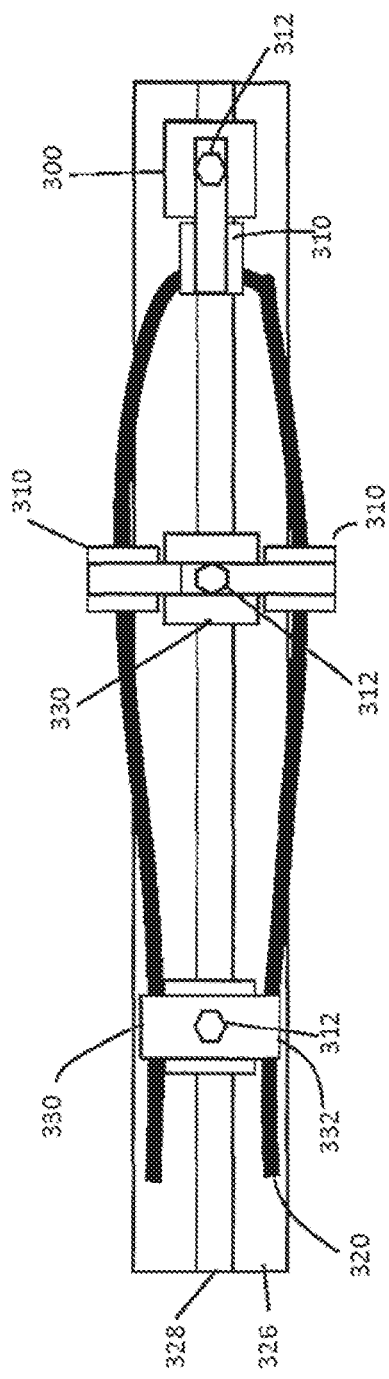
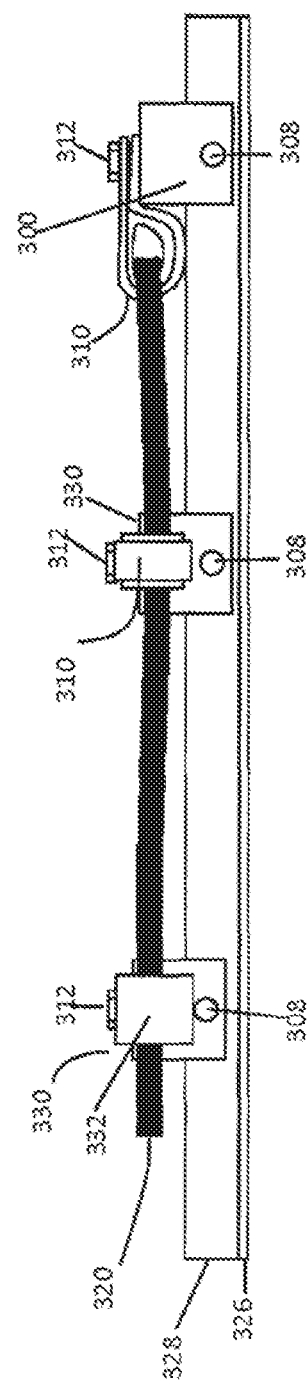
Fig. 8C
Fig. 8D

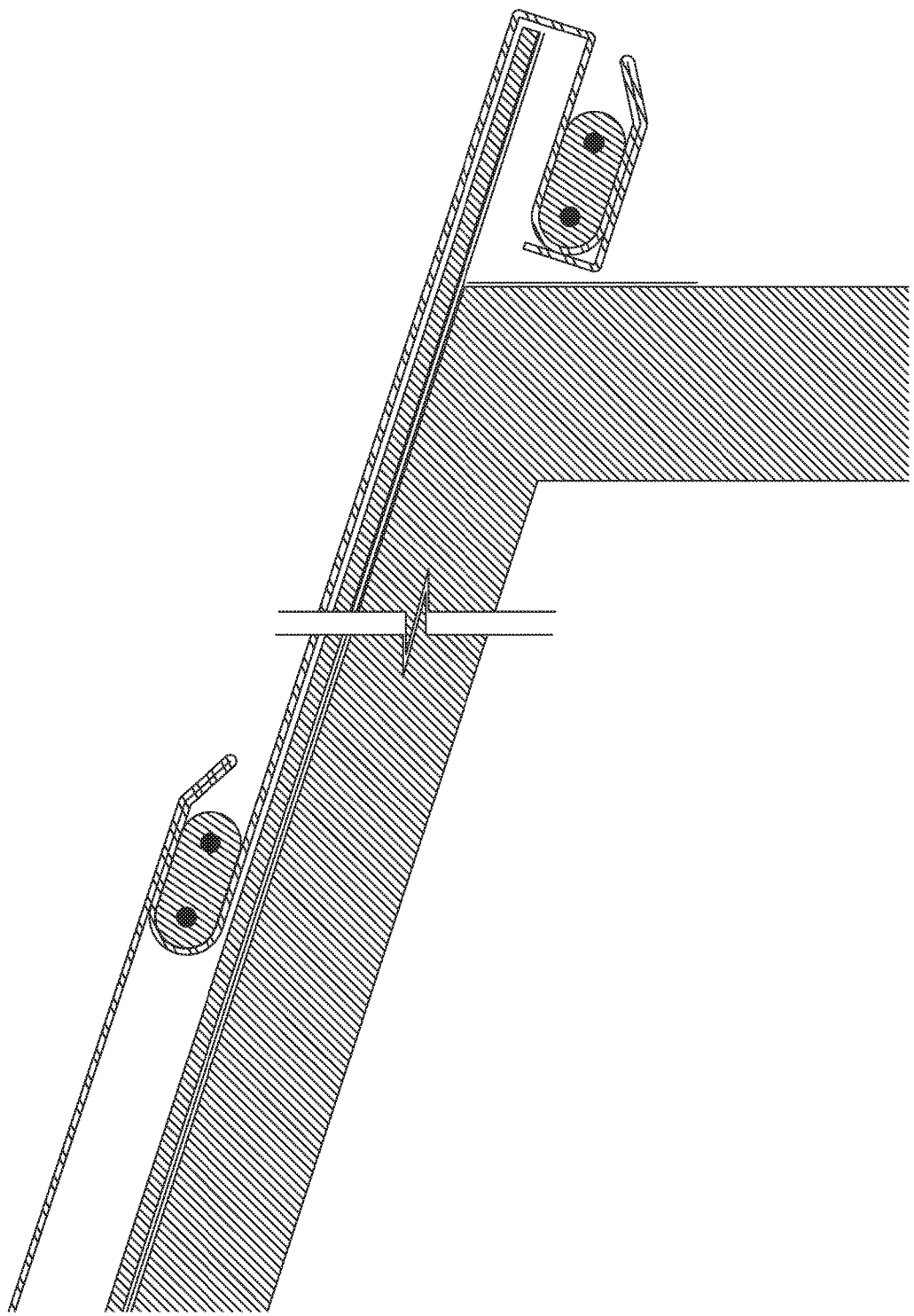

SYSTEM SECURING A CABLE TO A ROOF

RELATED APPLICATION DATA

This application is a Continuation-in-Part of U.S. Non-Provisional application Ser. No. 12/852,676 filed Aug. 9, 2010, which is a Continuation-in-Part of U.S. Non-Provisional application Ser. No. 12/765,140 filed Apr. 22, 2010, Ser. No. 12/686,578 filed Jan. 13, 2010, and Ser. No. 12/547,227 filed Aug. 25, 2009. The entire teachings of all are incorporated herein by reference in their entireties, and priority to all is claimed hereby.

BACKGROUND

This disclosure relates to cable raceways that form a channel for accommodating a cable at an edge of a roof, in a valley of a roof, and adjacent a raised seam on a roof. The raceway may accommodate a heating cable that melts snow and ice on a roof and otherwise prevents ice from accumulating on roof eaves. Although the disclosure is more focused toward a heating cable application, the raceway may also be used for other low voltage wiring applications like running security or audio wires.

SUMMARY OF THE INVENTION

The invention may be exemplified in or practiced by a system for securing a cable to a roof, including an apparatus that includes a metal base panel and a continuous metal C-shaped channel integrally-formed therewith, the channel having a first continuous channel wall and a flexible second continuous channel wall. The first and second channel walls may each have proximal and distal ends, and may be integrally joined at their proximal ends and separated at their distal ends by a continuous gap. The continuous gap may have an original gap width and an expanded gap width. The channel may have a continuous internal cavity between the channel walls. The gap may be resiliently increasable from the original gap width to the expanded by an outward flexing of the flexible second continuous channel wall to enable receipt of the cable into the continuous internal cavity.

The continuous internal cavity may conform snuggly around the received cable along at least the first and second continuous channel walls. The received cable may be at least partially viewable from the exterior of the apparatus through the continuous gap. The continuous metal C-shaped channel may cover at least most of the received cable to protect it from sunlight exposure. The continuous metal C-shaped channel may cover the received cable sufficiently to protect it from the elements or external hazards, such as wetting by rain. The continuous metal C-shaped channel may be externally flat to prevent being snagged by a roof rake passing there-over from the proximal end toward the gap. The distal ends may be without sharp corners or edges. The apparatus may be continuously linearly formed or extruded of aluminum.

The invention may also be exemplified in or practiced by a system for securing a heating cable having a cross-sectional cable shape to a roof where the system includes an apparatus that includes a metal base panel and a continuous metal C-shaped channel integrally-formed with the metal base panel and having a pair of opposing continuous channel walls creating and surrounding a continuous cavity having a cross-sectional cavity shape substantially identical for at least a majority thereof to the cross sectional cable shape. The pair of channel walls may be resiliently flexible to enable receipt of a continuous length of the heating cable within the continuous cavity such that the continuous length of the heating cable is in snug continuous contact with the continuous metal C-shaped channel along the at least a majority to enhance heat conductance from the continuous length of the heating cable to the metal base panel.

The metal base panel may be a continuous planar metal strip shaped to overlay a first portion of a sloped roof, including at least a portion of a lower horizontal edge of the roof. The continuous metal C-shaped channel may be disposed along the lower horizontal edge of the roof when the metal base panel overlays the first portion of the sloped roof. The received cable may be at least partially viewable from the exterior of the apparatus. The continuous metal C-shaped channel may cover the received cable sufficiently to protect it from sunlight exposure. The continuous metal C-shaped channel may cover the received cable sufficiently to protect it from the elements or external hazards, such as wetting by rain. The continuous metal C-shaped channel may be externally flat to prevent being snagged by a roof rake passing there-over. The continuous metal C-shaped channel may be without sharp corners or edges. The apparatus may be continuously linearly formed or extruded of aluminum.

The invention may also be exemplified in or practiced by a system for securing multiple heating cables having a cross-sectional cable shape to a roof, the system including a first apparatus and a second apparatus. The first apparatus may include a first metal base panel and a first continuous metal C-shaped channel integrally-formed with the first metal base panel and comprising a first pair of opposing continuous channel walls creating and surrounding a first continuous cavity having a cross-sectional cavity shape substantially identical for at least a first majority thereof to the cross-sectional cable shape. The first pair of channel walls may be resiliently flexible to enable receipt of a first continuous length of the heating cable within the first cavity such that the first continuous length of the heating cable is in snug continuous contact with the first C-shaped channel along the at least a first majority to enhance heat conductance from the first continuous length of the heating cable to the first metal base panel.

The first metal base panel may be a first continuous planar metal strip shaped to overlay a first portion of a sloped roof, including at least a portion of a lower horizontal edge of the roof. The first continuous metal C-shaped channel may be disposed along the lower horizontal edge of the roof when the first metal base panel overlays the first portion of the sloped roof.

The second apparatus may include a second metal base panel and a second continuous metal C-shaped channel integrally-formed with the second metal base panel and comprising a second pair of opposing continuous channel walls creating and surrounding a second continuous cavity having a cross-sectional cavity shape substantially identical for at least a second majority thereof to the cross-sectional cable shape. The second pair of channel walls may be resiliently flexible to enable receipt of a second continuous length of the heating cable within the second continuous cavity such that the second continuous length of the heating cable is in snug continuous contact with the second continuous metal C-shaped channel along the at least a second majority to enhance heat conductance from the second continuous length of the heating cable to the second metal base panel.

The first apparatus may also include a continuous upper edge integrally-formed with the first metal base panel and disposed opposite the first metal base panel from the first continuous metal C-shaped channel, and the second apparatus may also include a continuous lower edge integrally-formed with and adjacent the second continuous metal C-shaped channel, and one of the continuous upper edge of the first panel and the continuous lower edge of the second panel comprises an integrally-formed continuous receiving slot shaped to receive the other.

The second metal base panel may be a second continuous planar metal strip shaped to overlay a second portion of a sloped roof upslope from the first portion of the sloped roof. The second continuous metal C-shaped channel may be disposed upslope and parallel to the first continuous metal C-shaped channel when the second metal base panel overlays the second portion of the sloped roof. The received cables are at least partially viewable from the exterior of the first and second apparatuses. The first and second continuous metal C-shaped channels may cover the received cables sufficiently to protect them from sunlight exposure. The first and second continuous metal C-shaped channels cover the received cables sufficiently to protect them from the elements or external hazards, such as wetting by rain. The first and second continuous metal C-shaped channels may be externally flat to prevent being snagged by a roof rake passing there-over. The first and second continuous metal C-shaped channels may be without sharp corners or edges. The first and second apparatuses are continuously linearly formed or extruded of aluminum.

BRIEF DESCRIPTION OF THE DRAWINGS

Further detail of the disclosed embodiments follows in the detailed description below and is shown in the accompanying drawings wherein:

FIG. 8A is a partial perspective view of a structure with a roof with converging roof surfaces with heating cable installed thereon;

FIG. 8C is sectional top view of a flashing assembly used in area where two roof structures converge;

FIG. 8D is a side view of the flashing section of FIG. 8C;

FIG. 27 is a cross-sectional view through an edge attachment according to an eighteenth embodiment.

DETAILED DESCRIPTION OF THE EMBODIMENTS

Figure 1:
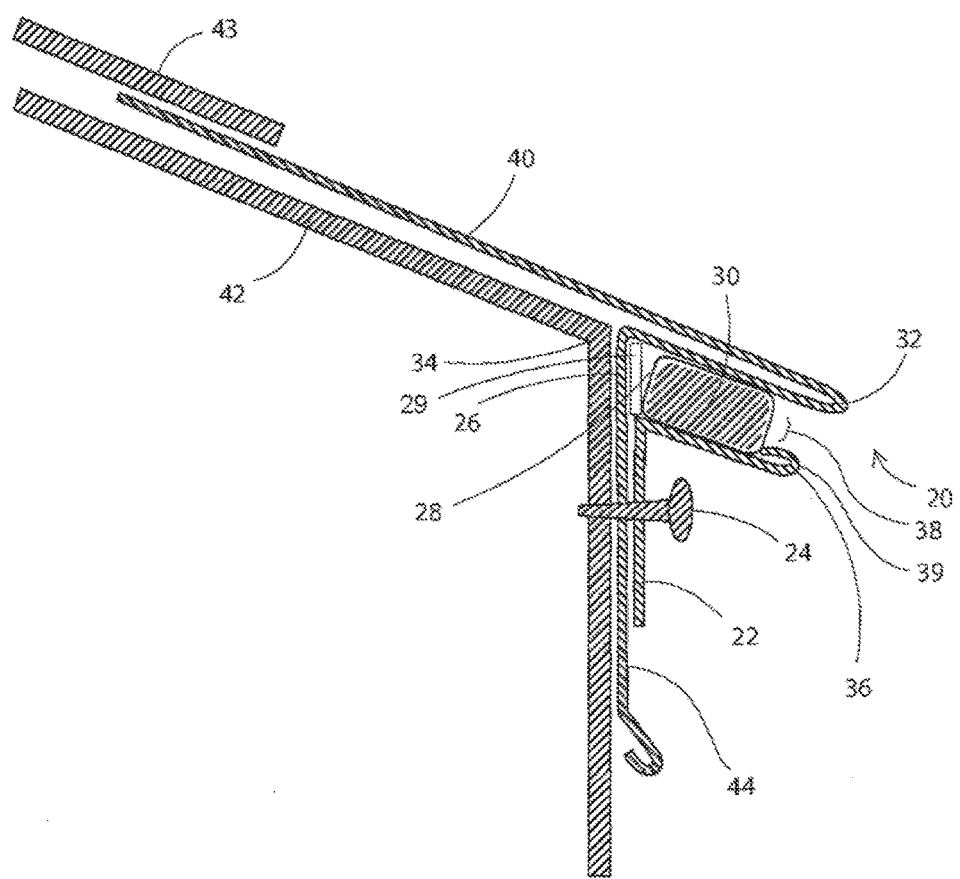
FIG. 1 is a schematic drawing showing a roof edge cable raceway comprising an edge attachment assembled with an overhanging drip edge mounted on an edge of a roof of a structure to form an open channel for housing a heating cable.

Often, ice dams form in very cold climates on the roof of a structure. The heat from inside the structure combined with ambient heat from sunlight will cause snow and ice from the upper roof to melt and drain as water to the roof overhang. Oftentimes, the roof overhang is colder than the upper roof because the underside of the roof overhang is not heated and sees no direct sunlight. This causes the melting snow and ice from the upper roof to refreeze at the roof edge causing an ice dam. An ice dam often causes the draining melting snow and ice to pool. Often, the pooling water backs up behind the ice dam and leaks into the structure causing damage to walls, ceilings, insulation, and electrical systems. The water can also lead to environmental issues such as mold and mildew. Often, an ice dam causes the formation of icicles at an edge of a structure that cause a hazard.

Generally speaking, correct roof drainage requires about a three-quarter inch additional overhang of roofing material from the structure front face (fascia board) to ensure drainage water flows into a gutter positioned adjacent to an edge of a roof of a structure. If the overhang is too short, melting snow and ice, and rain water will flow behind the gutter leading to rotted wood sheathing and fascia, stained siding, soil erosion at the foundation below and, potentially, flooded basements. In some construction techniques, asphalt roofs often have a three-quarter inch overhang of shingles to drain water into the gutters. In some construction techniques, shingle or shake roofs have a metal drip edge that acts as a support for the extended shingles or shakes, and the shingles or shakes completely cover the metal drip edge.

The roof edge cable raceway with an associated heating cable installed therein as described below prevents the formation of ice dams while improving the visual appearance of the structure in which the apparatus and heating cable is installed. The roof edge cable raceway described below may be used with many roofing types, including metal, raised seam metal, corrugated metal, shake, and conventional asphalt shingles, and may be used on residential housing, industrial buildings, bridges, electrical transformers, outdoor cabinets, enclosures and other structures. As described below and shown in FIGS. 1-7 and 10-15, the roof edge cable raceway forms a channel that extends along an edge of a roof of a structure. When a heating cable is installed in the channel, the effect of heat transfer from the cable to a heat conductive portion of the drip edge heats the edge of the roof sufficiently to prevent or melt any ice dams, thereby enhancing drainage of melting snow and ice and preventing the formation of icicles. As described below and shown in FIGS. 1-7 and 10-15, the roof edge cable raceway may comprise an edge attachment fitted to a drip edge, for instance, an existing overhanging drip edge already installed on an edge of a roof of a structure, or may comprise a drip edge, or an overhanging style drip edge, with an integrally formed (if not monolithically formed) open channel structure.

The roof edge cable raceway and open channel structure may be configured to house a resistance-type heating cable, or a self-regulating heating cable, or other low voltage style cabling applications, for instance, cables used for lighting, security cameras or audio speakers. Generally speaking, in a heating cable application as described below, the heating cable must have a snug fit in the channel to maximize heat transfer from the heating cable to the roof. Although not necessary, the entire roof edge cable raceway may be formed from a heat conductive material to simplify construction. In the alternative, the side of the channel adjacent the edge of the roof, and the portion of the roofing materials in contact therewith may be formed from a heat conductive material to allow heat transfer to the area adjacent the roof edge, or in an alternate use where heat transfer is not critical, i.e., low voltage style cabling applications, the raceway may be formed of plastic or PVC materials.

As an example, and not in any limiting sense, FIGS. 1-5 show various embodiments of a roof edge cable raceway 20 used to form an open channel structure along an edge of a roof of a structure in which a heating cable is housed. The heating cable transfers heat directly to a heat conductive portion of the roof edge cable raceway preventing ice build-up at the drip edge and the formation of ice dams on the roof edge. Heat from the cable is concentrated at the drip edge. The open channel structure allows ready replacement and inspection of the heating cable. The channel is defined by channel sides that preferably extend along the length of the channel and define an opening into the channel. The channel may extend along the entire length of the roof edge or a portion of the roof edge desired to be heating.

FIG. 1 shows a roof edge cable raceway 20 comprising an edge attachment 22 assembled with mechanical fasteners 24 to an overhanging drip edge 26 to form a channel 28 for housing a heating cable 30. The channel 28 has a first side 32 positioned adjacent a roof edge 34 and a second channel side 36 spaced there-from. Together, the channel sides 32, 36 define an opening 38 for the channel 28. The open channel 28 allows replacement and inspection of the heating cable 30 through the opening 38 from a position in front of the channel opening. As shown in FIG. 1, the second channel side 36 may be formed by mounting the edge attachment 22 at a position sufficient to allow the cable 30 to be visible in the opening 38 of channel from a position in front of the channel while allowing the sides of the channel to be urged against the cable with a snug fit to removably secure the cable in the channel. The second channel side 36 may comprise a radiused outer edge 39. The radiused outer edge provides additional resiliency to springably retain and/or removably secure the heating cable in the channel. The radiused outer edge also assists installation personnel in installing the heating cable in the channel. Although the radiused outer edge 39 is shown in FIG. 1, the distal edge of the edge attachment may also be flat without a radius.

As described above, the edge attachment functions as a biasing member urging the heating cable upward in FIG. 1 toward the channel first side. However, this may be reversed and the channel first side may function as a biasing member urging the heating cable downward in FIG. 1 toward the edge attachment. In the alternative, the biasing member may be a separate resilient member that is inserted in the channel, for instance, below the cable to urge the cable upward in FIG. 1 toward the channel first side. The separate resilient member may comprise a wave form elongated member disposed in the channel adjacent one or both of the channel sides; a foam rubber material disposed in the channel adjacent one or both of the channel sides; rubber, silicone, or plastic inserts that extend along the channel sides and/or engage one or both of the channel sides; or rubber, silicone, or plastic inserts periodically spaced along the length of the channel sides, for instance, in openings in one or both of the channel sides. The biasing member may be made from a heat conductive material to maximize heat transfer from the cable to the adjacent roof structure. The drawings show a relatively simplified construction of the raceway, involving less components, where one or both of the channel sides is formed to be resiliently deflected or springably moved to allow the heating cable to be removably secured in the channel.

The first channel side (i.e., the channel side adjacent the roof edge) 32 has a roof engagement portion 40 extending there-from adapted to overlie and be secured to a portion 42 of the roof of the structure adjacent the roof edge 32. As shown in FIG. 1, the roof engagement portion 40 may also extend beyond the roof edge to form the overhanging portion of the drip edge. While the roof engagement portion of FIG. 1 has an exposed lower part with shingles or shakes 43 covering an upper part of the roof engagement portion, additional row(s) of shingles or shakes may cover the lower exposed part of the roof engagement portion and may extend to or beyond the roof edge thereby covering a majority or all of the roof engagement portion, as may be desired depending upon the construction techniques used. Drain slots (not shown) may be provided through the roof engagement portion, for instance, the lower portion of the roof engagement portion that forms the drip edge, and into the channel so that water may drain from under the lower shingles. A fascia mounting portion 44 may extend from the first channel side 32 in a direction generally transverse to the roof engagement portion 40, and the edge attachment 22 forming the second channel side may be mounted thereto.

The overhanging style drip edge (or drip edge) may comprise a pre-existing installation on the edge of the roof of the structure, thus allowing one to secure the edge attachment to the overhanging drip edge to form the channel, for instance in a retrofitting type of application. In this regard, the edge attachment 22 may comprise a member with a generally L-shaped cross-section that is mounted below the overhanging drip edge with a space there-between that forms the channel 28. While FIG. 1 shows the use of mechanical fasteners 24 to secure the edge attachment to the fascia board to form the channel, other methods may be used, including providing the fascia mounting portion of the overhanging drip edge with a system of locking tabs that cooperate with the edge attachment to secure the edge attachment in the proper location to form a channel suitable for housing the heating cable.

Using an edge attachment comprising a member having a generally L-shaped cross-section allows flexibility for the scope of work to be performed by on-site metal fabricators. For instance, on-site metal fabricators may form the edge attachment and install the edge attachment on the existing structure to form the open channel at the necessary dimensions to snugly fit the heating cable in the channel, and then the heating cable may then be installed in the open channel. To assist in mounting the edge attachment at the required spacing so that the channel accommodates the heating cable with a snug fit, the generally "L"-shaped edge attachment 22 may have a removable, and/or detachable (i.e., "knock-out" style) tab 29 projecting from its corner. In the alternative, the heating cable may be positioned adjacent the roof edge and then the edge attachment installed with the cable in place. As another example, the edge attachment may be mounted to a preexisting F-style overhanging drip edge installed on the structure. In the alternative, on site-metal fabricators may install the F-style overhanging drip edge and then the edge attachment. In the alternative, on-site metal fabricators may bend sheets of flat or rolled flashing materials as necessary to form and then install an overhanging drip edge and edge attachment. Various other combinations and sequences are also possible depending upon whether the work involves new construction, or remodeling or retrofitting of an existing structure.

Generally, the drip edges, such an F-style overhanging drip edges, comprise aluminum materials, for instance, extruded aluminum materials. Flashing generally also comprises aluminum sheets or rolls of aluminum. By closely mounting the edge attachment to the overhanging drip edge, the edge attachment and/or overhanging drip edge may be resiliently deflected or springably moved slightly to allow the heating cable to be snugly fit there-between. As discussed before, forming a radiused outer edge 39 on the edge attachment provides additional resiliency for snugly retaining and/or removably securing the heating cable in the channel. Additionally, when replacement of the cable is needed, the cable may be removed by pushing the channel sides to an apart position an amount sufficient to release the cable from the channel through the opening without mechanical deformation of the edge attachment or drip edge. A new heating cable may be then be readily installed using the existing raceway by moving the channel sides to an apart position to allow the new heating cable to inserted through the opening into the channel. Alternatively, mechanical fasteners holding the edge attachment in place may be removed (or loosened if the edge attachment is provided with elongated or "peanut-shaped" holes) thereby allowing the heating cable to be removed. A new heating cable may then be installed in the channel using one of the aforementioned methods.

The tight contact between the heating cable and the channel sides allows heat transfer through the heat conductive materials (i.e., aluminum) from the cable to a heat conductive portion of the roof edge cable raceway to a portion of the roof adjacent the drip edge, thus enabling the drip edge to be heated sufficiently to prevent ice formation at the edge of the roof of the structure. However, it is not necessary that the edge attachment be formed from a heat conductive material. Rather, the roof engagement portion and the channel first side may be made from a heat conductive material to allow heat transfer from the heating cable to the underside of the roofing materials for heating at the roof edge, and the edge attachment as well as the fascia engagement portion may be made from a different material.

Figure 2:
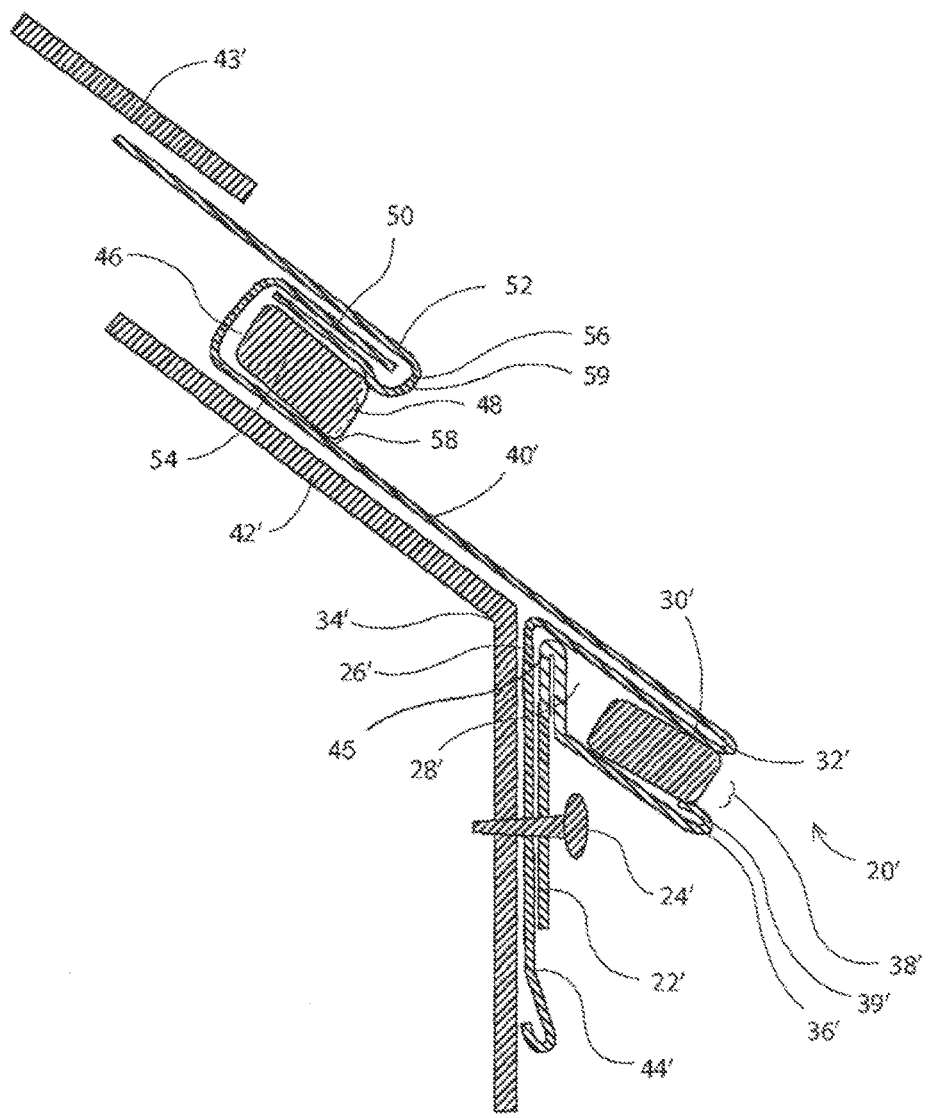
FIG. 2 is a schematic drawing showing a first alternate embodiment of a roof edge cable raceway comprising the edge attachment of FIG. 1 and an overhanging drip edge with a second channel formed in a roof engagement portion of the overhanging drip edge for housing a second heating cable.

FIG. 2 shows an alternate embodiment of a roof edge cable raceway having the same basic arrangement of that of FIG. 1. In that regard, elements appearing in FIG. 2 that are related to those of FIG. 1 will be indicated with a ('). As with the embodiment of FIG. 1, the edge attachment 22' is assembled with mechanical fasteners 24' to the fascia mounting portion 44' of the overhanging drip edge 26' to form the channel structure 28' for spingably retaining and/or removably securing the heating cable 30', and the channel has a first side 32' positioned adjacent the roof edge 34' and a second side 36' spaced there-from defined by the mounted position of the edge attachment 22'. The second channel side 36' may have a radiused outer edge 39'. Together the first and second sides 32', 36' define an opening for the channel. As with the embodiment of FIG. 1, the channel first side 32' has a roof engagement portion 40' extending there-from up the roof 42' and beyond the roof edge 34' to form the overhanging portion of the drip edge. Also as with the embodiment of FIG. 1, shingles or shakes 43' do not extend to the roof edge and a lower part of the roof engagement portion is exposed. Also, as with the embodiment of FIG. 1, a fascia mounting portion 44' may extend from the channel first side in a direction generally transverse to the roof engagement portion with the edge attachment 22' forming the second channel side may be mounted thereto.

However, in the embodiment of FIG. 2, a spacer 45 is integrally formed on the edge attachment 22' to assist in locating the edge attachment at the proper spacing to form the channel opening 38' to accommodate the heating cable, rather than the tab of FIG. 1. Although not shown in the drawings, the generally "L"-shaped edge attachment of FIG. 1 may be similarly configured with an integrally formed spacer. Also, in the embodiment of FIG. 2, the roof engagement portion 40' is provided with a second channel 46 having an opening 48 at an upper portion 50 of the roof engagement portion. The opening 46 of the channel 48 may be formed by overlapping the upper portion 50 of the roof engagement portion 40'. An additional section of flashing material 52 may interlock with the upper portion 50 in the second channel 46 and may extend under the roofing materials 43' (i.e., shingles, shakes, etc.) (not shown) a further distance up the roof 42' from the edge 34' of the roof of the structure. The second open channel 46 a houses a second heating cable 54 to increase the area of snow and ice that may be melted at the edge of the roof of the structure. Channel sides 56, 58 define the second channel opening 48, and at least one of the sides 56, 58 of the second channel is sufficiently resilient to allow the heating cable 54 to be inserted through the opening into the second channel 46 in manner to allow the heating cable to be secured in the second channel with the heating cable being visible through the opening from a position in front of the opening of the second channel. For instance, as shown in FIG. 2, the second channel first side 56 may have a relatively large radiused edge 59 to assist in providing added resiliency for the second channel first side to springably retain and/or removably secure the second heating cable 54 in the second heating channel. This radius feature may be reversed and provided on the second channel second side. Although FIG. 2 shows the added flashing 52 interlocking with the roof engagement portion 40', it should be appreciated that the second channel 46 may be monolithically formed with the roof engagement portion of the overhanging drip edge and/or monolithically formed with the added flashing. Additionally, it should be appreciated that a biasing member may be provided in a manner as previously described in one or both of the first and second channels to assist in removably securing a cable therein.

Figure 3:
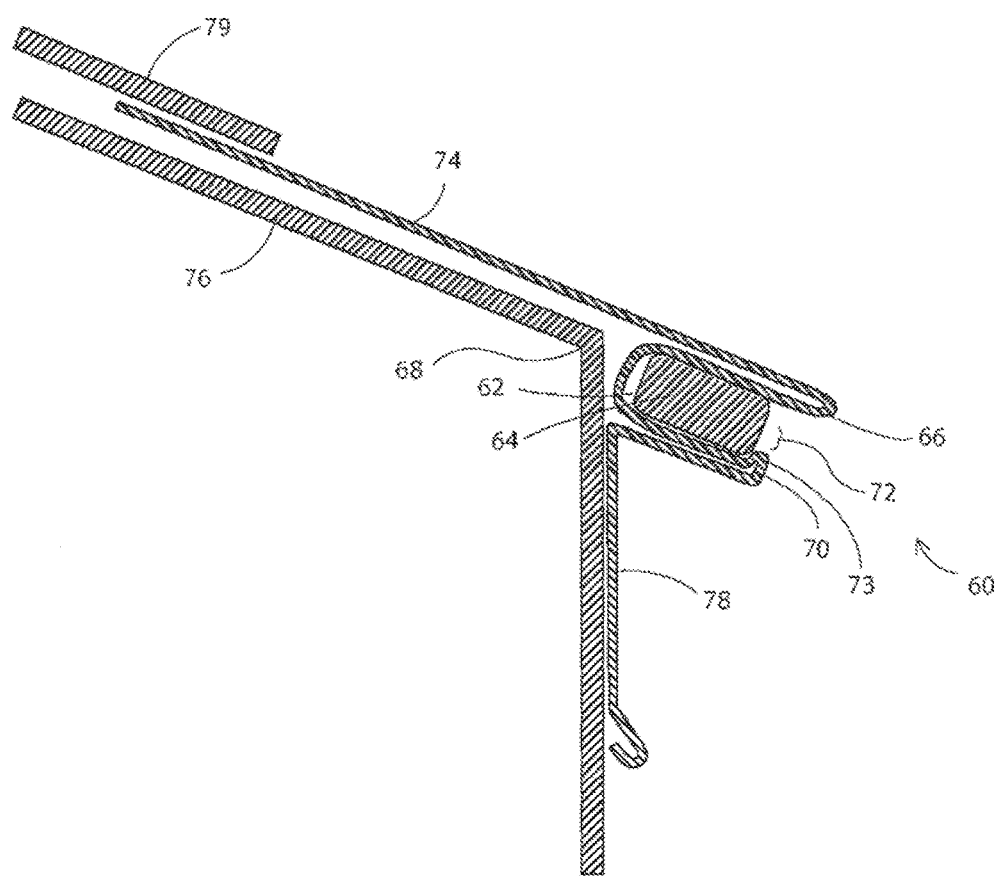
FIG. 3 is a schematic drawing showing a second alternate embodiment of a roof edge cable raceway mounted on an edge of a roof of a structure with a monolithically formed open channel for housing a heating cable.

FIG. 3 shows a roof edge cable raceway 60 with a monolithically formed channel 62 that is pre-formed for a heating cable 64. The channel 62 has a first side 66 positioned adjacent a roof edge 68 and a second side 70 spaced there-from. Together the channel sides 66, 70 define an opening 72 into the channel 62, and one or more of the channel sides may be sufficiently resilient to be springably moved to allow insertion of the heating cable 64 through the opening 72 into the channel 68 in a manner to allow securing the heating cable in the channel with the heating cable being visible through the opening from a position in front of the opening. The resiliency of the channel sides also allows replacement of the heating cable without deformation of the channel. The channel second side 70 may have a relatively large radiused edge 73 to assist in providing added resiliency for the channel second side to springably retain and/or removably secure the second heating cable 54 in the second heating channel. It should be appreciated that a biasing member may be provided in a manner as previously described in the channel to assist in removably securing a cable therein. The roof edge cable raceway 60 may comprise a roof engagement portion 74 that is adapted to overlie and be secured to a portion 76 of a roof of the structure on the channel first side, and a fascia engagement portion 78 extending from the channel second side. The roof engagement portion may also extend beyond the roof edge 68 to form an overhanging roof edge. Preferably, the roof engagement portion 74, the fascia engagement portion 78, and the channel sides 66, 70 are monolithically formed. In the alternative, the roof engagement portion and the channel first side may be made from a heat conductive material to allow heat transfer from the heating cable to the underside of the roofing materials 79 for heating at the roof edge, and the fascia engagement portion may be made from a different material. The embodiment of FIG. 3 may also be provided with a second channel (not shown) on the roof engagement portion similar in arrangement to that of FIG. 2 or a second channel monolithically formed with the roof engagement portion in the manner mentioned previously. Also, the embodiment of the roof edge cable raceway of FIG. 3 may be extruded as a monolithic member or may be formed on-site by metal fabricators bending flashing as needed into the form as shown FIG. 3 in the manner mentioned previously.

Figure 4:
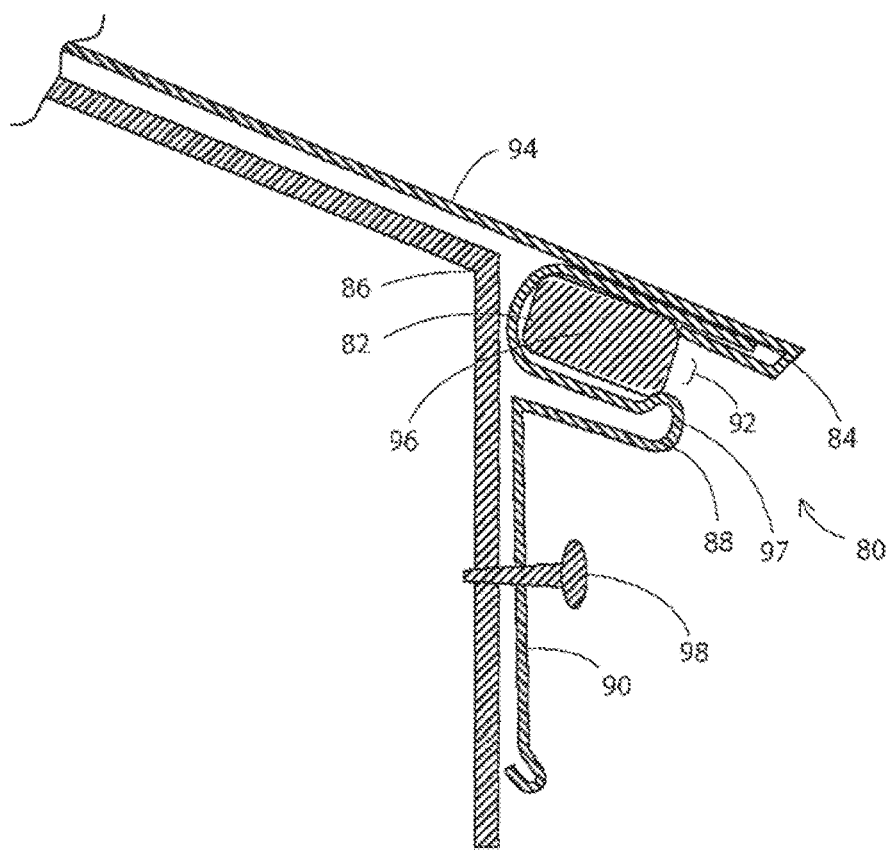
FIG. 4 is a schematic drawing showing a third alternate embodiment of roof edge cable raceway mounted on an edge of a roof of a structure with a J-shaped cross-section adapted for housing a heating cable.

FIG. 4 shows an alternate embodiment of a roof edge cable raceway 80 comprising an open J-style channel. In the embodiment shown in FIG. 4, a channel 82 is formed monolithically with a first side 84 of the channel adjacent a roof edge 86 and an opposite, second side 88 of the channel having a fascia engagement portion 90 extending therefrom. Together, the channel sides 84, 88 define an opening 92 extending along the length of the channel 82. The channel first side 84 may engage roofing materials 94, for instance, a metal roof. As described previously, one or more of the channel sides 84, 88 may be sufficiently resilient to be springably moved to allow insertion of a heating cable 96 into the channel 82 through the opening 92, while retaining the heating cable in the channel with a snug fit sufficient to allow heat from the cable to transfer to the channel and roof to prevent the formation of an ice dam. The channel second side may be provided with a large radiused outer edge 97 to assist in providing added resiliency for the channel second side to springably retain the heating cable 96 in the channel. The J-style open channel also allows the heating cable to be removably secured in the channel thereby allowing inspection and/or replacement at a later date as needed. It should be appreciated that a biasing member may be provided in a manner as previously described in the channel to assist in releasably securing a cable therein. As shown in FIG. 4, the channel and fascia engagement portion are monolithically formed. However, it should be appreciated that the first channel side may be made from a heat conductive material to allow heat transfer to the roofing materials with the second channel side and/or fascia engagement portion made from a different material. Also, the embodiment of the roof edge cable raceway of FIG. 4 may be extruded as a monolithic member or may be formed on-site by metal fabricators bending flashing as needed into the form as shown in FIG. 4. The roof edge raceway of FIG. 4 may be secured to the structure being using mechanical fasteners 98 at the fascia engagement portion 90.

Figure 5:
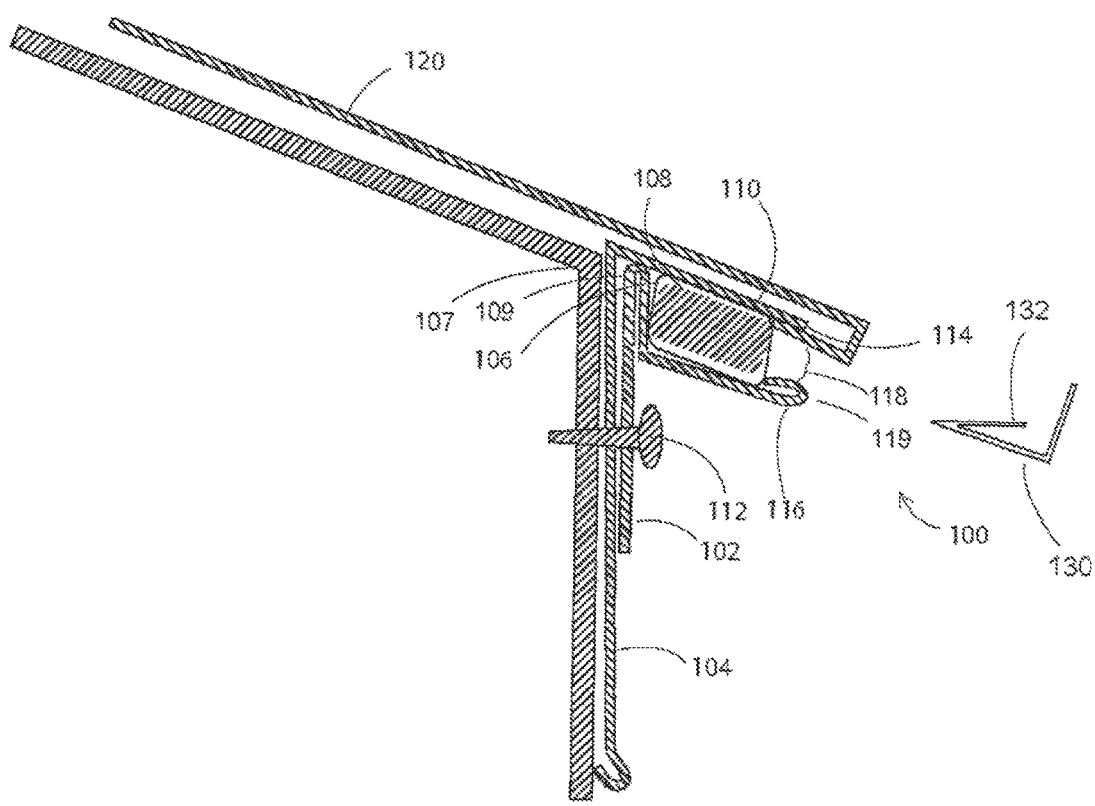
FIG. 5 is a schematic drawing showing a fourth alternate embodiment of a roof edge cable raceway comprising an edge attachment secured to existing fascia flashing provided on a structure to form a channel adapted for housing a heating cable.

FIG. 5 shows an alternate embodiment of a roof edge cable raceway 100 wherein an edge attachment 102 is assembled with existing fascia flashing 104 provided on a structure in a manner to form a channel 106 at an edge 107 of the roof of the structure for accommodating a heating cable 108. As with embodiment of FIG. 2, the edge attachment 102 of FIG. 5 may be provided with a spacer 109 to assist in locating the edge attachment at a spacing corresponding to the size of the heating cable. As shown in FIG. 5, the fascia flashing 104 comprises a generally "L"-shaped member with a roof engagement portion 110. The edge attachment 102 may also comprise a member having a generally L-shaped cross-section that may be secured to the structure and/or fascia flashing 104 with mechanical fasteners 112. In the alternative, the fascia flashing and edge attachment may have a system of cooperating tabs and notches to allow the edge attachment to be positioned on the fascia flashing in a manner to create a channel sufficient to house the heating cable in a manner as described previously. As shown in FIG. 5, the roof engagement portion 110 of the existing fascia flashing 104 forms a channel first side 114, and the mounted position of the edge attachment defines a channel second side 116. Together, the channel sides define an opening 118 for the channel 106. The first channel side 114 may engage roofing materials 120, for instance, a metal roof. At least one of the sides of the channel, for instance, the side of the channel formed by the edge attachment, may be sufficiently resilient to allow it to be springably moved to allow insertion of the heating cable in the channel in a manner to allow securing the heating cable in the channel with the heating cable visible from the opening. As shown in FIG. 5, the channel second side may be provided with a large radius edge 119 to assist in providing added resiliency for the second side in snugly retaining the heating cable in the channel. The spacer 109 assists in setting the spacing to allow the heating cable to be snugly fit in the channel. The open channel of FIG. 5 also allows the heating cable to be inspected and/or replaced at a later date as needed, using one or more of the methods discussed above. Again, a snug fit ensures maximum heat transfer to the flashing and the roof structure to provide adequate melting at the roof edge. However, it should be appreciated that a biasing member may be provided in a manner as previously described in the channels to assist in releasably securing a cable therein. In the embodiment of FIG. 5, the engagement portion 110 of the fascia flashing may be made from a heat conductive material and the edge attachment may be made from a different material.

FIG. 5 also shows a cover 130 that may be provided to cover the opening of the channel and also a biasing member 132 to urge the heat cable upward in the channel. The cover 130 and biasing member 132 shown in FIG. 5 may be added to any of the channels of the preceding figures. After the heating cable is installed, the cover 130 may be fitted into the channel so the biasing member 132 fits under the cable and pushes the cable against the roof engagement portion. Preferably, the biasing member provides a tight fit for the cable against the roof engagement portion thereby maximizing heat transfer to the roof engagement portion and drip edge. Preferably, the cover 130 and biasing member 132 are made from a heat conductive material so as to maximize heat transfer to the roof engagement portion and drip edge and to reduce the effects of air being trapped between the cable and the roof engagement portion and drip edge that may otherwise reduce the rate of heat transfer.

Figure 6:
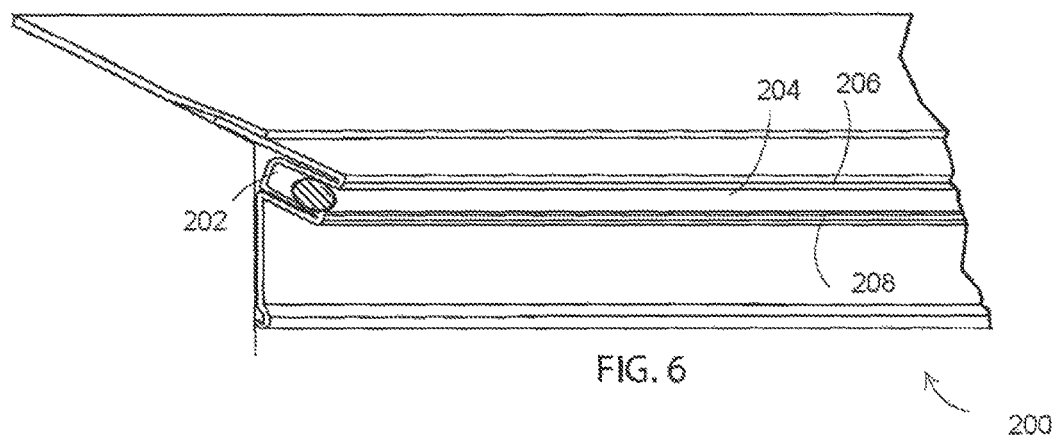
FIG. 6 is a schematic drawings showing a partial edge view of a channel according to a fifth embodiment formed along an edge of a roof of a structure using any one of the roof edge cable raceways shown in FIGS. 1-5 with a heating cable disposed therein.

FIG. 6 shows a schematic drawing of roof edge cable raceway 200 with an open channel structure 202 with a heating cable 204 disposed therein and channel sides 206, 208 springably urged against the cable 204 to removably secure the cable in the channel.

Figure 7:
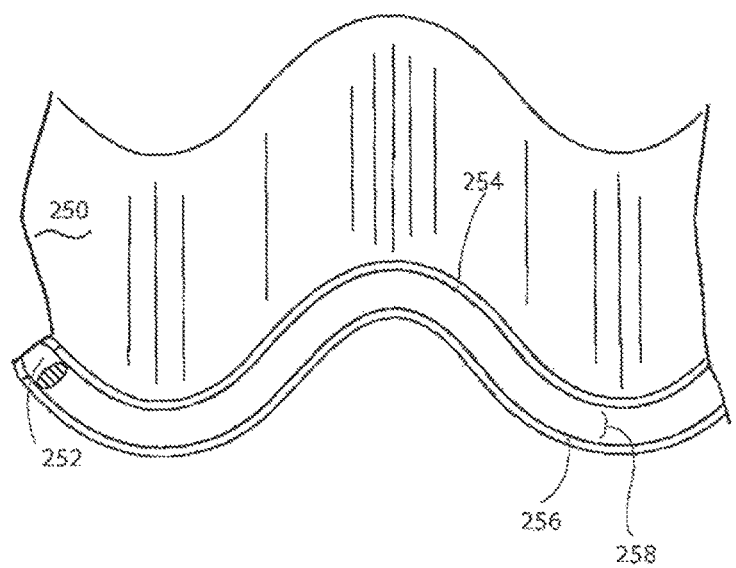
FIG. 7 is a schematic drawing showing a partial edge view of a channel according to a sixth embodiment formed along an edge of a corrugated roof of a structure with a curvilinear roof edge cable raceway with a heating cable disposed therein.

FIG. 7 shows a corrugated roof 250 with a raceway 252 formed on its edge for housing a heating cable 254. In the embodiment of FIG. 7, corrugated roofing materials 256 that have curved features that match the corrugated roof 250 of the structure are secured to the structure below the edge of the existing corrugated roof with a space 258 sufficient in dimension to house the heating cable 254 there-between.

Figure 8:
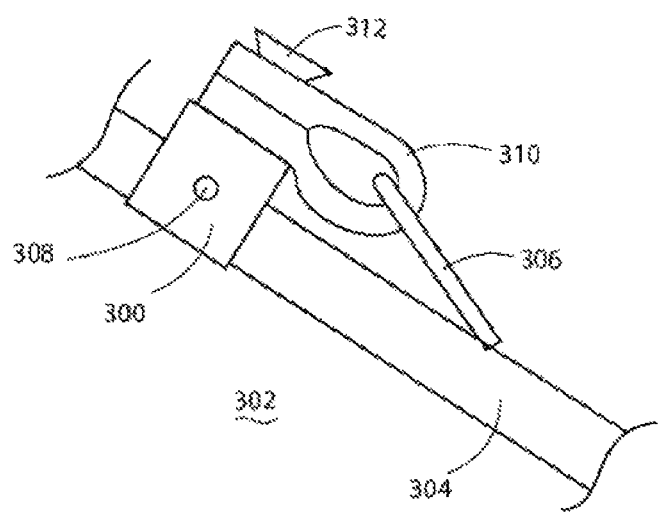
FIG. 8 is a schematic drawing of a clamping mechanism used to secure a heating cable to a point on a seam of a metal roof.

Each of the heating cables described herein may be used in connection with a roof clamp 300 in a system shown schematically in FIG. 8. Some roofs 302 have raised metal seams 304 that require protection from water leaking into the seam and penetrating the structure. Oftentimes, a heating cable 306 is extended from the drip edge up to a point on the roof past the interior wall to provide a drain path for melted snow or ice. For instance, a heating cable may extend around a fireplace or in the areas where different peaks of a roof converge. On raised seam metal roofs as shown in FIG. 8, the clamp 300 may be secured to the roof with mechanical fasteners 308. On conventional shingle or shake roofs, the clamps may be adhered to the roof with glue. A cable loop 310 is secured to the clamp with a mechanical fastener 312 with the heating cable 306 passing through the opening of the loop. The roof edge cable raceway and heating cable described herein may be used in connection with one or more of heating cable clamps 300 in the illustrative example shown in FIG. 8. Accordingly, a portion of the heating cable may exit the roof edge cable raceway channel through the opening and extend up the roof to the clamp before returning down the roof to the roof edge and back into the roof edge cable raceway channel through the opening. Thus, it is not necessary that the entire heating cable be housed in the roof edge cable raceway channel.

Figure 8E:
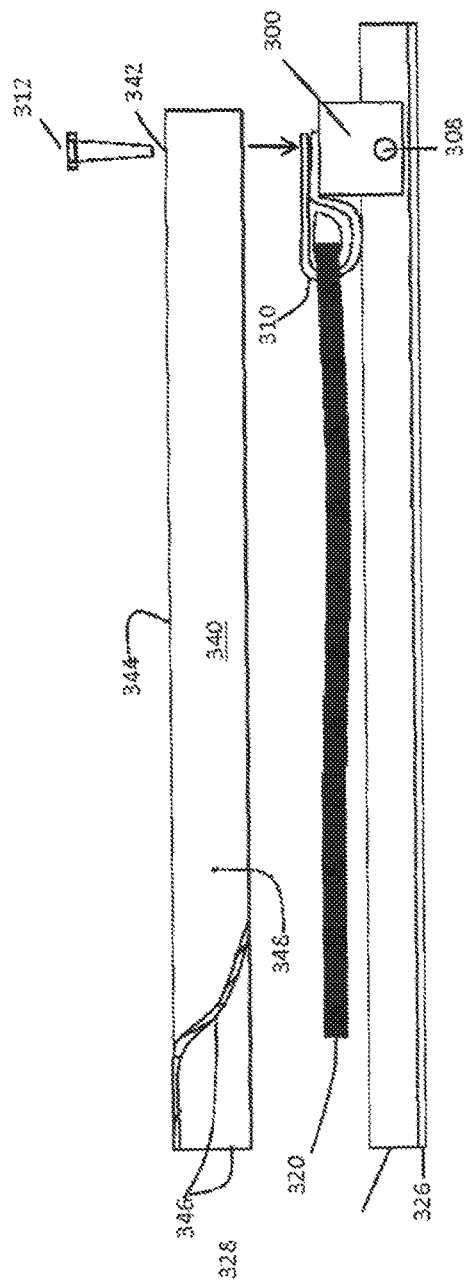
FIG. 8E is a sectional side exploded view of a second flashing assembly comprising a cover and the general arrangement of the flashing section of FIG. 8D, with an end portion of the cover shown in section to illustrate its preferred cross sectional arrangement.
Figure 8B:
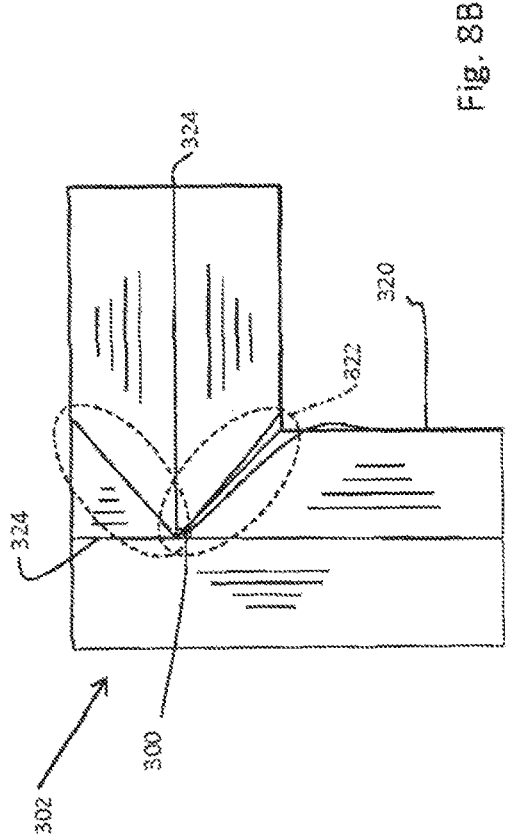
FIG. 8B is a top elevational view of a structure with converging roof surfaces with a heating cable installed thereon.

FIGS. 8A and 8B shows an application where a heating cable 320 is routed in the area 322 where different peaks 324 of a roof 302 converge. The cable 320 may be secured in position in the convergence of the roof peaks through a clamp 300 such as that shown in FIG. 8. Referring to FIGS. 8C and 8D, to allow the installer to affix the clamp 300 in position to properly secure the cable in position in the convergence of the roof peaks, the flashing 326 installed in the convergence of the roof peaks may be formed with a raised seam 328, thus allowing the clamp 300 to be secured to the roof vis-a-vis the flashing raised portion with a mechanical fastener 308. The raised seam may comprise a generally "U"-shaped bend in a flat flashing piece 326 thus giving the flashing a "t" shape. The flashing may comprise a "valley pan" and/or additional flashing attached to the "valley pan." The heating cable may run generally longitudinally along flashing for instance in the area 322 of FIG. 8A or FIG. 8B. In this configuration, the heating cable extends from the roof edge to the clamp 300 to form a first run of cable, and then from the clamp 300 back to the roof edge to form a second run of heating cable. An additional clamp(s) 330 with two or more cable loops 310 such as that shown in FIGS. 8C and 8D may be used to run the cable 320 as necessary, for instance, to secure the first and second runs to the flashing. A generally "U"-shaped cable keeper 332 may also be used to secure the cable to the clamp instead of multiple cable loops. In the alternative, the bend in the flashing may extend along a width of the flashing to allowing installing the cable at other positions on a roof, for instance, adjacent the dormers shown in FIG. 8A. A single loop and clamp may used where there the first and second runs of cable are spaced apart or if there is only a single run of heating cable. Instead of or in addition to the additional clamps 330 of FIGS. 8C and 8D, a cover 340 may be used to cover a run(s) of heating cable. As shown in FIG. 8E, the cover 340 may have a generally "U"-shaped cross section, and may attach to the clamp 300 through the common cable loop fastener 312 directed through a hole 342 in a top surface 344 of the cover or with another fastener connectable with the clamp. The cover may have side walls 346 to confine the cable runs within an interior 348 of the cover thereby protecting the cables and providing a more aesthetic appearance for the roof. The cover may also comprise a flat flashing member.

In addition to using a cover on raised seam of a valley pan as shown in FIGS. 8A-8E, a cover 3340 may also be used in connection with cable runs extending adjacent raised seams of a roof, for instance, a metal roof. FIGS. 8F through 8J illustrate different embodiments of arranging a cable (preferably a heating cable) at or adjacent to a raised seam 3328 of a metal roof 3302. In a heating or ice melt application, the heating cable 3320 heats the area around the raised seam 3328, thereby preventing ice dam formation in and around the raised seam area. The heating cable (or runs of cable) may be covered with the cover to retain the heating cable(s) in abutting arrangement with the raised seam 3328 and to provide an aesthetically pleasing arrangement for the raised seam metal roof. Additionally, by providing a cover which is releasably attached to the raised seam, the cover may be removed as necessary to expose the cable for inspection and/or replacement.

Figure 8F:
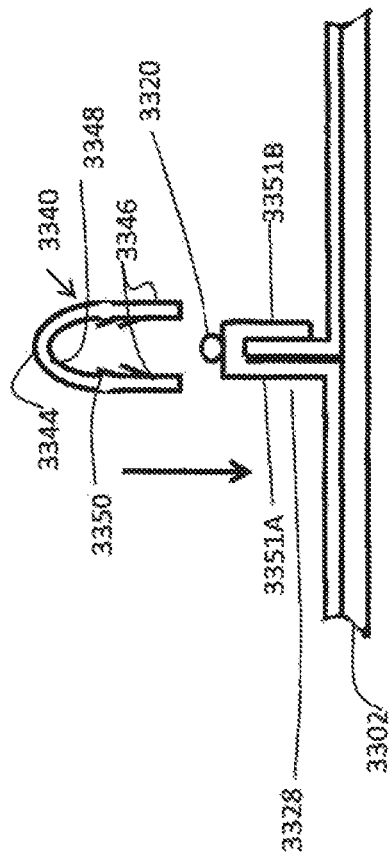
FIG. 8F is a cross sectional view of a raised seam metal roof showing an arrangement where the heating cable is positioned atop the raised seam with a cover.

FIG. 8F shows an arrangement comprising a metal roof 3302 with a raised seam 3328 with a heating cable 3320 positioned atop the raised seam. The heating cable is held in place with a cover 3340, which is pressed over the heating cable and raised seam in the direction of the arrow to provide an aesthetically pleasing arrangement for the metal roof. As stated before, the cover 3340 may have side walls 3346 and a top surface 3344 forming a generally "U" shaped cross section with an interior 3348. In the embodiment of FIG. 8F, the interior 3348 forms an internal channel, and in the embodiment of FIG. 8F the internal channel is dimensioned to fit both the cable 3320 and also a portion of the raised seam 3328. As stated previously, the cover 3340 may be releasably attached to the raised seam 3328 to allow the cover to be removed for inspection and/or replacement of the heating cable. In one embodiment, the cover may be provided with a plurality of internal barbs 3350 extending in a spaced fashion longitudinally in the interior 3348 along the side walls 3346 of the cover. The barbs springably extend from the side walls into the interior so as to be urged against and engage lateral sides 3351A, 3351B of the raised seam 3328 to hold the cover in place. The barbs may also frictionally engage the lateral sides of the raised seam. In the alternative to or in addition to, a clamp 300 as shown in FIGS. 8C through 8E may be used to secure the cover to the raised seam adjacent to or at the ridge portion of the roof.

Figure 8H:
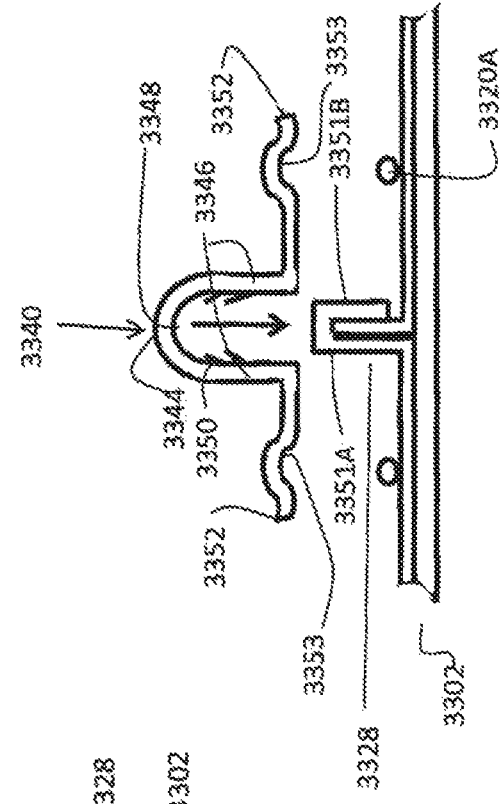
FIG. 8H is a second alternate configuration to that shown in FIG. 8F where a cover has extended flank portions on each side of the raised seam and one run of heating cable is positioned on one of the flank portions and a second run of heating cable is positioned on the opposite flank portion.
Figure 8G:
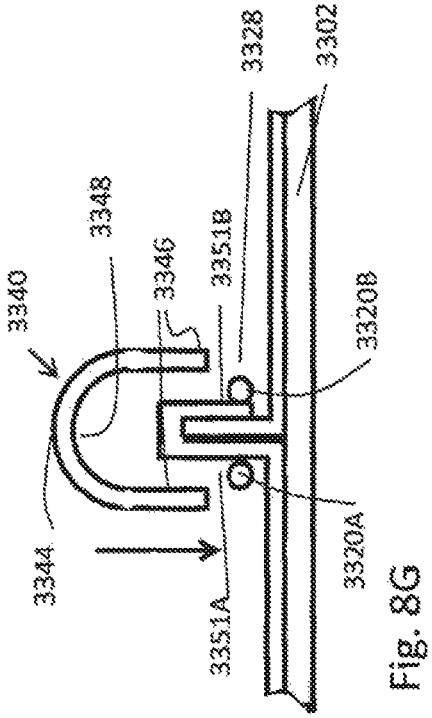
FIG. 8G is a first alternate configuration to that shown in FIG. 8F where one run of heating cable is positioned on a first side of the raised seam and a second run on heating cable is positioned on an second side of the raised seam within a cover.

FIG. 8G is an alternate configuration to that shown in 8F where one run of heating cable 3320A is positioned on the first side 3351A of the raised seam 3328 and a second run of heating cable 3320B is positioned on a second, opposite side 3351B of the raised seam 3328. As stated before, a cover 3340 is placed over the runs of cable and the raised seam to provide an aesthetically pleasing arrangement for the roof while maintaining the cables in abutting contact with the raised seam. The cover in FIG. 8G may be provided without a system of internal barbs, and may be held in place with a clamp 300. As with the embodiment of FIG. 8F, the cover 3340 of FIG. 8G also has an interior 3348 that forms an internal channel, and in the embodiment of FIG. 8G the internal channel is dimensioned to fit both the cable runs 3320A,3320B, and also at least a portion, and preferably all, of the raised seam 3328.

FIG. 8H shows an alternate embodiment to the arrangement of FIGS. 8F and 8G wherein the cover 3340 is provided with extended flank portions 3352 extending transverse to the side walls 3346 of the cover. Each of the extended flank portions 3352 of the cover have a raised portion 3353 forming an internal channel in their midsections sized to accommodate a heating cable 3320A, 3320B. The ends of the portions 3352A, 3352B may be angled upwards slightly. The angling allows the cover to be installed and the cable inserted into the raised portion as may be desired depending upon the installation techniques used. The angling also allows the cable to partially visible when the cable is seated in the raised portion 3353 with the cover installed thereby allowing the cable to be inspected after installation.

In the embodiment shown in FIG. 8H, the heating cables may be moved away from side walls of the raised seam and held in place with the cover in abutting contact with the roof 3302. The cover 3340 of FIG. 8H may frictionally engage the side walls of the raised seam and/or may be held in place with a clamp as previously described.

Figure 8J:
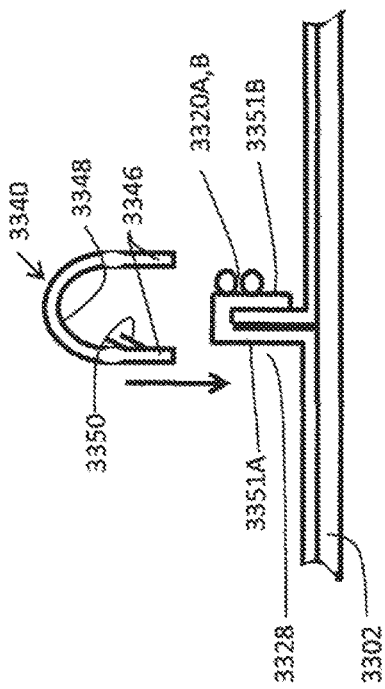
FIG. 8J is a fourth alternate configuration to that shown in FIG. 8F where two runs of heating cable are positioned on one side of the raised seam within a cover.
Figure 8K:
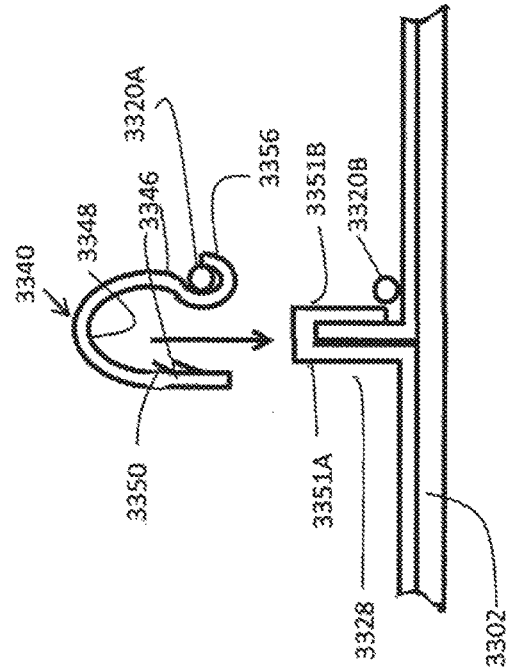
FIG. 8K is a fifth alternate configuration to that shown in FIG. 8F where two runs of heating cable are positioned on one side of the raised seam with one run on an exposed lower edge of a cover and the second run below the exposed lower edge of the cover.
Figure 8I:
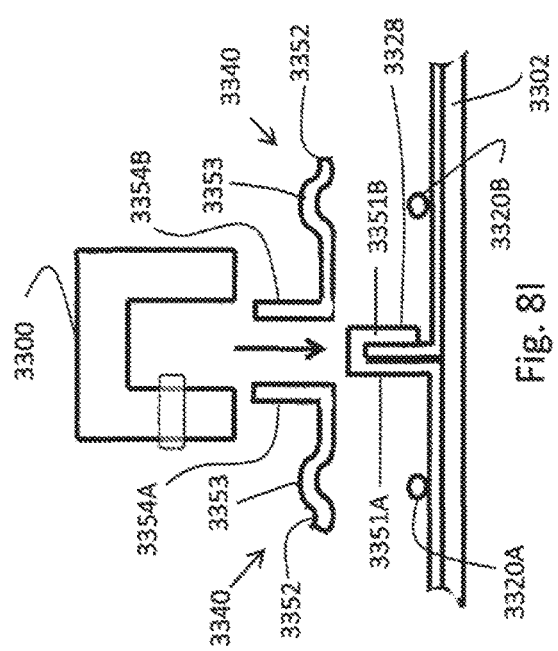
FIG. 8I is a third alternate configuration to that shown in FIG. 8H where a cover comprises two generally "L"-shaped portions with one "L"-shaped portion on each side of the raised seam and one run of heating cable is positioned adjacent one "L"-shaped portion and a second run of heating cable is positioned adjacent the other "L"-shaped portion.

While FIG. 8H shows a cover 3340 as a monolithically formed member with the flank portions 3352 extending transversely to the "U"-shaped cover sidewalls 3346, FIG. 8I shows an alternate embodiment where the cover 3340 may comprise a generally "L"-shaped piece. An upstanding portion 3354A of "L"-shaped cover piece may be positioned adjacent a first lateral side wall 3351A of the raised seam and an upstanding portion 3354B of the second "L"-shaped cover piece may be positioned adjacent the opposite lateral side wall 3351B of the raised seam. Portions 3352 of the cover 3340 have a raised portion 3353 forming an internal channel in their midsections sized to accommodate a heating cable 3320A, 3320B. In such an arrangement, the portions 3352 of the "L"-shaped cover piece may abut and contact the roof 3302. The cover 3340 may be held in place secured to the raised seam 3328 with a clamp 3300 as previously described. The ends of the portions 3352A, 3352B may be angled upwards slightly. The angling allows the cover to be installed and the cable inserted into the raised portion as may be desired depending upon the installation techniques used. The angling also allows the cable to partially visible when the cable is seated in the raised portion 3353 with the cover installed thereby allowing the cable to be inspected after installation.

In FIG. 8J, two runs of heating cable 3320A, 3320B are positioned on one lateral side 3351B of the raised seam within a cover 3340. In the embodiment shown in FIG. 8I, the cover may be provided with internal barbs 3350 on one side of the cover to engage the lateral side wall 3351A of the raised seam opposite the side with the cables. The cover of FIG. 8J has an interior 3348 that forms an internal channel, and in the embodiment of FIG. 8J, the internal channel is dimensioned to fit both the cable runs 3320A, 3320B, and also a portion of the raised seam 3328.

FIG. 8K is a further alternate configuration where two runs of heating cable 3320A, 3320B are positioned on one lateral side 3351B of the raised seam. One run of heating cable 3320A is positioned on an exposed lower edge 3356 of the cover and a second run 3320B is positioned below the exposed lower edge of the cover. As shown in FIG. 8J, the lower edge 3356 of the cover may be formed into an internal channel to contain one run of the heating cable. The cover 3340 may be biased downward against the surface of the roof 3302 such that the exposed lower edge of the cover biases the second run 3320B of heating cable against the roof. Internal barbs 3350 provided on the cover may engage the side walls 3351A, 3351B of the metal seam roof and urge the cover downward to hold the second run of cable against the metal roof. In the arrangement shown in FIG. 8J, the heating cables are exposed allowing them to be rapidly inspected as necessary.

Figure 9:
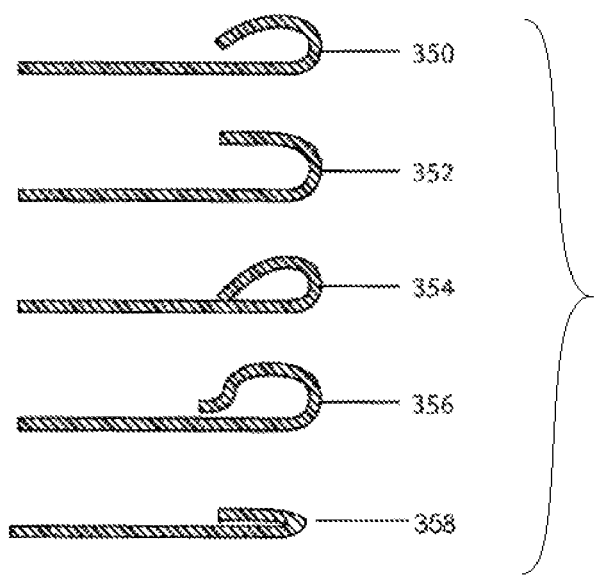
FIG. 9 shows various alternate embodiments of radiuses for sides of the channel or end edges of any of the edge attachments described herein.

FIG. 9 shows alternate embodiments of radius styles that may be provided on one or more of the sides of the channel for added resiliency to springably retain and/or removably secure the heating cable in the channel. The radius or hem style may also be provided on the edge of any of the edge attachments, fascia mounting portions, or roof engagement portions. For instance, the edge attachment comprising a generally "L"-shaped cross section may have a distal edge folded back onto itself with a radius in one of the exemplary styles 350, 352, 354, 356, 358 thereby forming a channel second side with added resiliency. As mentioned previously, providing one or more channel sides with a radiused edge facilitates installation, although one or more of the channel side may be flat. The distal end of the fascia mounting portion may also have a radius edge in one of the exemplary styles 350, 352, 354, 356, 358 to direct drainage away from the structure.

Figure 10:
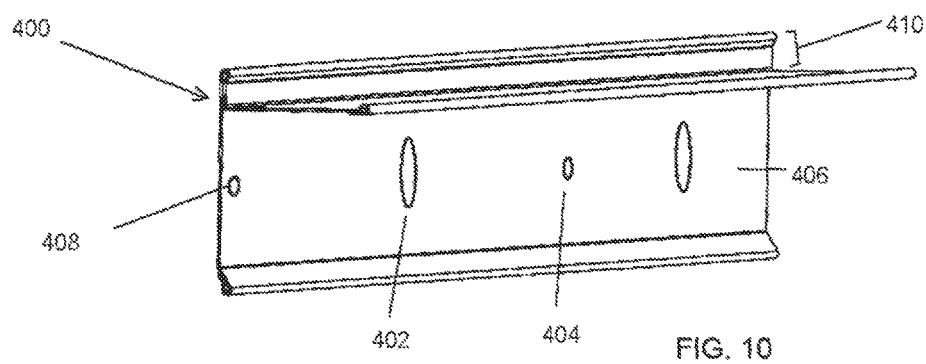
FIG. 10 shows a partial perspective view of a seventh alternate embodiment of an edge attachment which may be used to form the roof edge cable raceway of FIGS. 1, 2, and 5.
Figure 11:
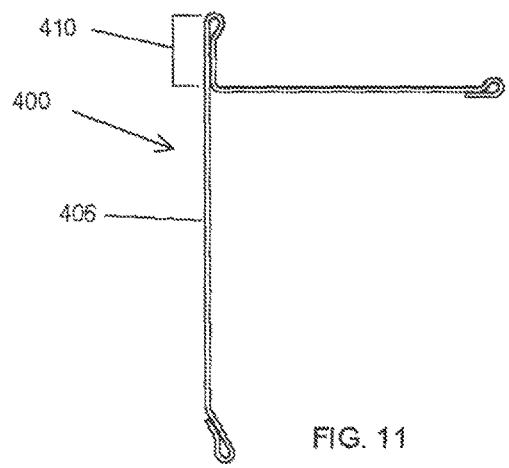
FIG. 11 shows a cross sectional view of the edge attachment of FIG. 10.
Figure 12:
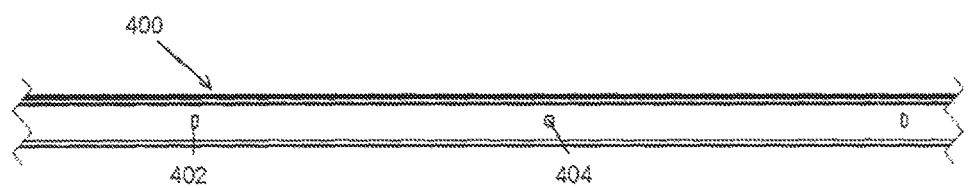
FIG. 12 shows a partial front view of the edge attachment of FIG. 10.

FIGS. 10-12 show an alternate embodiment of an edge attachment 400 that may be used in connection with the cable raceways of FIGS. 1, 2, and 5. The edge attachment 400 may comprise a generally L-shaped cross section as described above and used with a roof drip edge having a slight pitch. The edge attachment may be extruded and made from a heat conductive material as described above. FIG. 12 shows an embodiment where a system of vertically elongated adjustment slots 402 and pilot holes 404 may be provided on a vertical member 406 portion of the edge attachment. The vertical adjustment slots 402 allow an installer to mount the edge attachment 400 loosely to the fascia, for instance, through the drip edge fascia mounting portion or fascia flashing as the case may be, install the heating cable in the race way channel, and then make the final fit up and adjustment to springably retain the cable in the channel. A connection hole 408 (for instance, a vertical adjustment slot or pilot hole) may also be provided at each end of the edge attachment to allow adjacently mounted edge attachments to be overlapped and connected to the fascia with a common mechanical fastener. The pilot holes 404 allow the installer to lock each respective length of edge attachment in place against the fascia and thereby determine the final channel width. The pilot holes eliminate the potential for a length of the edge attachment to slip down the vertical elongated slot from expansion and contraction of the edge attachment and mechanical fastener located in the vertical elongated slot. As mentioned previously with respect to FIG. 2, a spacer 410 may be integrally formed on the edge attachment 400 to assist in locating the edge attachment at the proper spacing to form the channel opening to accommodate the heating cable as may be desired, for instance, after installation of the edge attachment, the cable may be inserted in the raceway.

Figure 13:
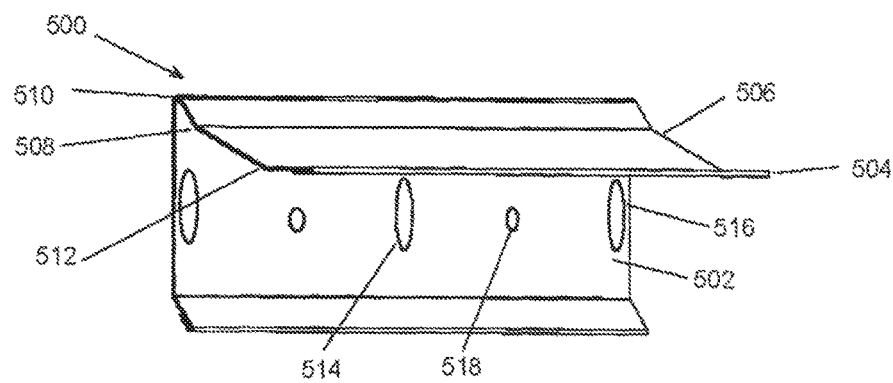
FIG. 13 shows a perspective view of an eighth alternate embodiment of an edge attachment which may be used to form the roof edge cable raceway of FIGS. 1, 2, and 5.
Figure 14:
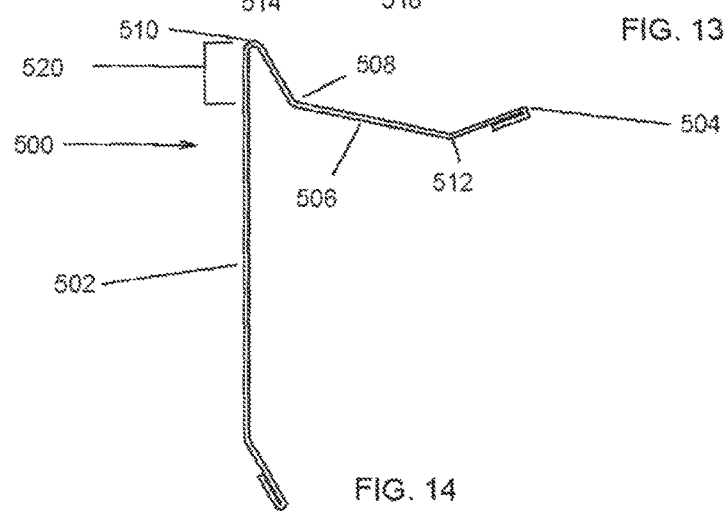
FIG. 14 shows a cross sectional view of the edge attachment of FIG. 13.
Figure 15:
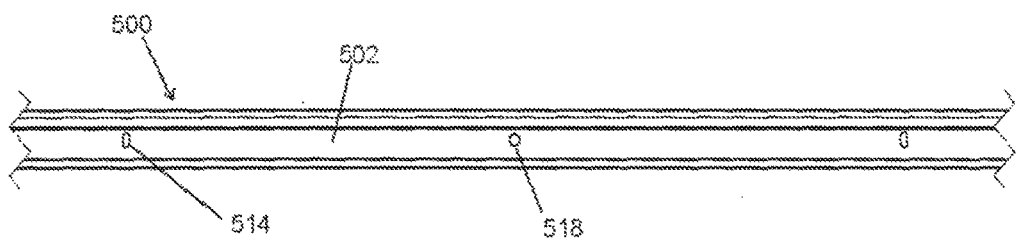
FIG. 15 shows a partial front view of the edge attachment of FIG. 13.

FIGS. 13-15 show a further alternate embodiment of an edge attachment 500 that may be used in connection with the cable raceways of FIGS. 1, 2, and 5. The edge attachment may be adjustable to allow the edge attachment to be used with a roof drip edge having many different roof pitches. For instance, the edge attachment shown in FIGS. 13-15 may comprise a "V"-shaped member to allow it to be adjustable. Other cross-sectional arrangement may also be used. The "V"-shaped cross section comprises a web member 502, a support member 504 that may abut the heating cable disposed in the raceway channel, and an adjustment member 506 extending between the support member and the web member. Preferably, the adjustment member 506 is resiliently deformable allow the "V" shaped cross section to be bent by the installer to fit each individual job or by the manufacture to order, thus allowing a manufacturer to have one shape in stock but meet many different applications. The "V"-shaped cross section as shown in FIGS. 13-15 may be used with a range of roof pitches from 0:12 to 12:12. As shown in FIG. 14, the web member 502 may be generally vertically oriented, the support member 504 generally horizontal or transverse to the web member, and the adjustment member comprising at least one bend line 508 to allow the adjustment member to be resiliently deformed. Bending may occur at one or more of the bend line(s) 508, the coterminous edge 512 of the adjustment member and the support member, and/or the coterminous edge of the adjustment member and the web member 510. An installer may place the edge attachment in a conventional brake and rotate the adjustment member 506 and the support member 504 as desired along the bend line 508, the bend line 510, and/or the bend line 512 as desired depending upon the pitch of the roof. As with the embodiment of FIGS. 10-12, a system of vertically elongated adjustment slots 514, connection slots 516 (i.e., an adjustment slot at an end of the edge attachment), and pilots holes 518 may be provided in the web member 502 of the edge attachment. Also, a spacer 520 may be integrally formed on the edge attachment 500 to assist in locating the edge attachment at the proper spacing to form the channel opening to accommodate the heating cable as may be desired, for instance, after installation of the edge attachment, the cable may be inserted in the raceway.

Systems for securing heating cables to roofs for de-icing and melting snow are subject to Article 426 of the National Electric Code Handbook, the entirety there-of-which is incorporated herein by reference. A commonly employed heating cable for use in such systems is Weather-Ready™ Self-Regulating Heating Cable made by Nu-Heat®, having a cross sectional shape 0.63 inches wide by 0.32 inches high, with each short edge rounded at an approximate 0.16 inch radius, for the 240V version, and a cross sectional shape 0.51 inches wide by 0.22 inches high, with each short edge rounded at an approximate 0.11 inch radius, for the 120V version. While the dimensions provided in the included figures anticipate the use of the Nu-Heat 120V cable, the use of the 240V cable or other cables having other cross-sectional shapes is anticipated and would be optimized by dimensioning the cable channel cross-sectional shapes to match.

When used in the remainder of this disclosure, including in the claims, the term "continuous" is meant to mean "without interference from one end to the other". For instance, each embodiment may be formed from a roll of sheet metal such that the device runs continuously along the entire relevant length of the roof as an uninterrupted piece.

Or each embodiment may be extruded as an uninterrupted piece that runs continuously along the entire relevant length of the roof. Or each device may be made of shorter continuous lengths, say 3 or 5 feet long, that are disposed in series along the relevant length of the roof, either overlapping at their adjacent ends, abutting at their adjacent ends, or leaving a slight expansion-allowing gap between their adjacent ends. All of these variations are considered within the intended meaning of "continuous".

Figure 16:
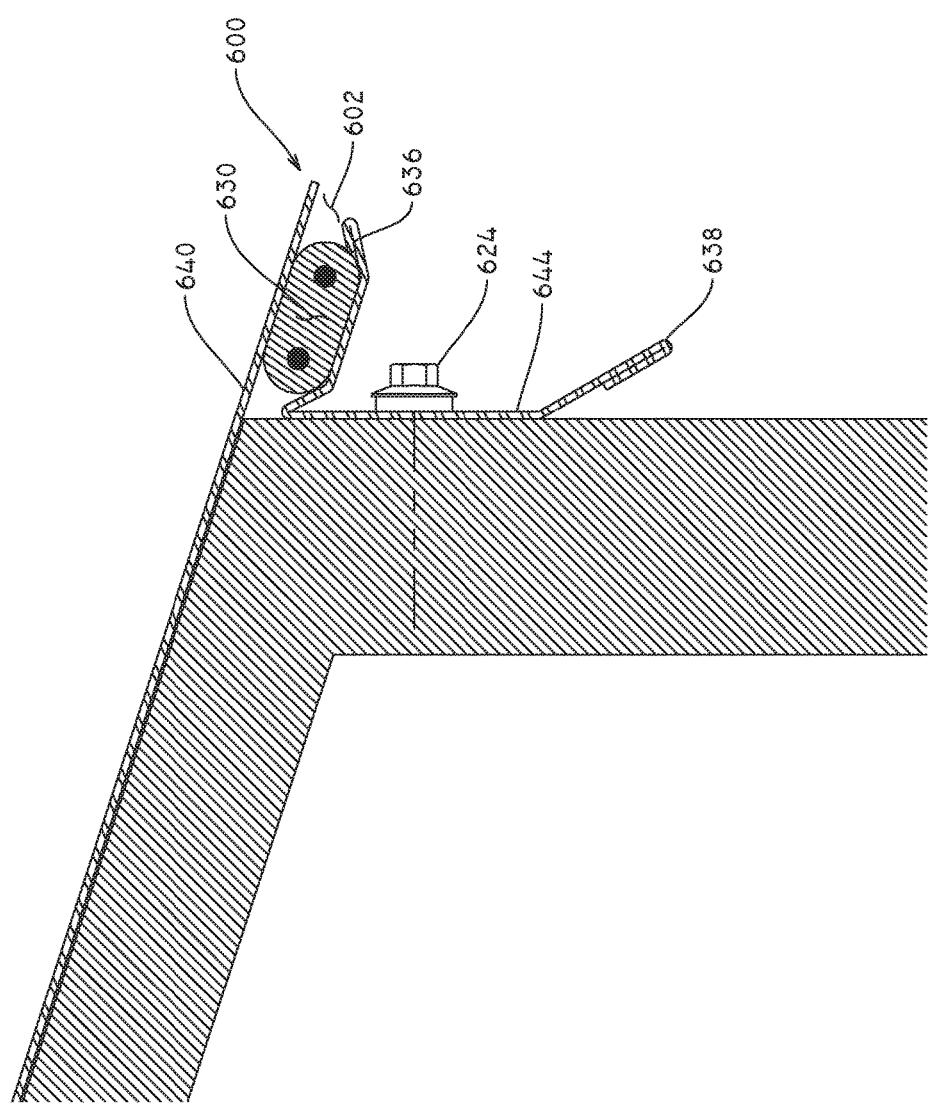
FIG. 16 is a cross-sectional view through an edge attachment according to a ninth embodiment.

FIG. 16 shows an alternate embodiment of a roof edge cable raceway 600 for use with common drip edge. A channel 602 is formed between the drip edge 640 and the outward extension 636 of cable support 644 to capture commercial grade self-regulating heat cable 630 or other cables. Lag screws 624 secure the cable support to hold the cable snuggly against the drip edge along any desired length of the fascia. The flexibilities of the cable support and drip edge allow the heating cable to be removably secured in the channel thereby allowing inspection and/or replacement as needed. This design is intended to employ drip edge including or similar to that already commonly used. The channel support is preferably made of the same metal as the drip edge to securely compress the cable against the drip edge to transfer sufficient heat to prevent ice dams and icicles from developing. The cable is partially visible for maintenance, inspections and replacement to conform to the NEC Article 426. The heat is transferred directly to the drip edge. The cable is protected from UV light. Lip 638 extends for the fascia to prevent moisture on the cable support from dripping down the house wall.

Figure 17:
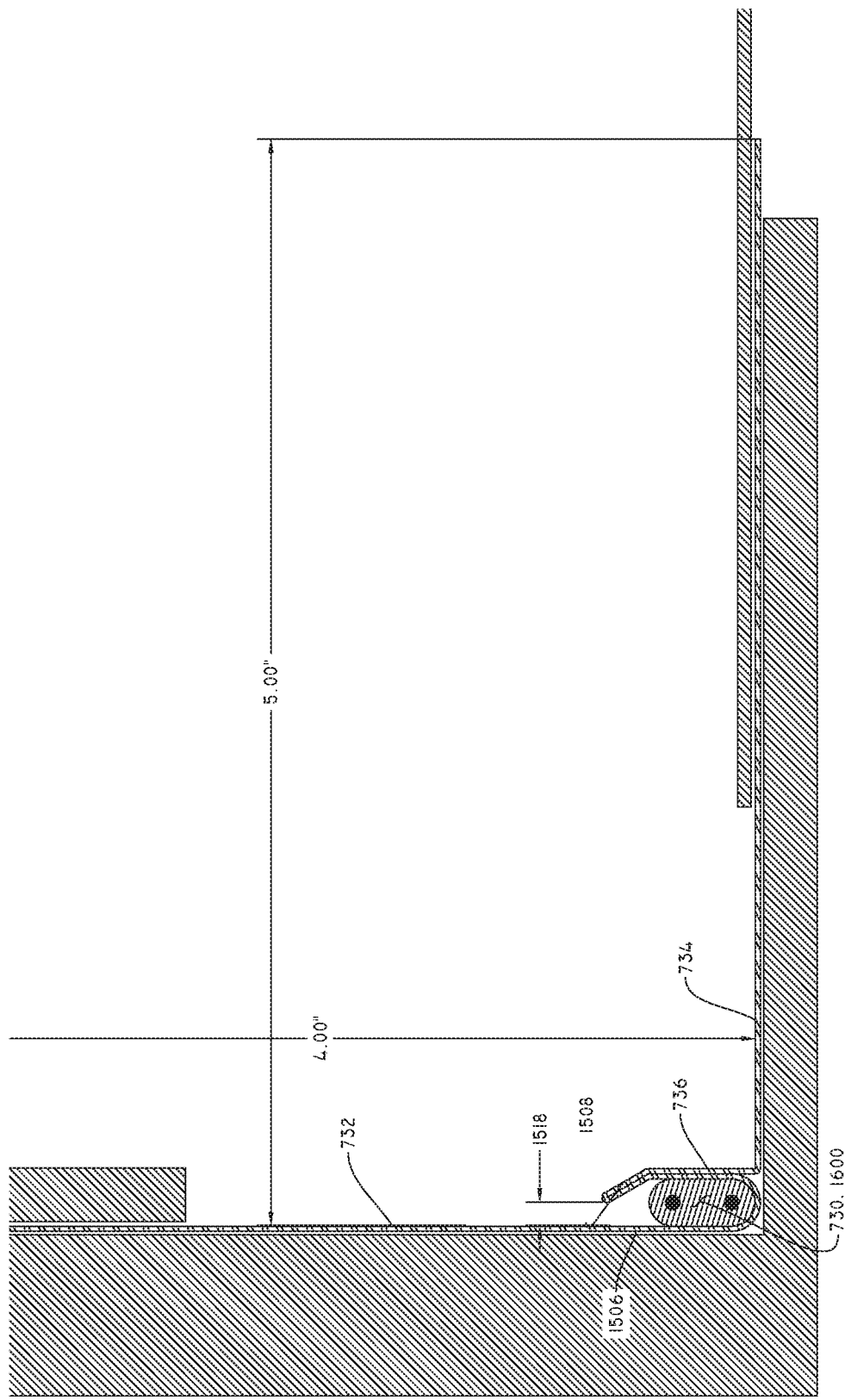
FIG. 17 is a cross-sectional view through an inside corner attachment.

FIG. 17 shows an arrangement 700 for securing commercial grade self-regulating heat cable or other cables at an inside corner of a roof. The cable 703 is pushed into channel 702 which is formed between extension 736 and wall 732. While shown as right-angular, the angle between walls 732 and 734 may be altered to suit the particular shape of the inside corner or valley of the roof. Preferably made of continuously formed sheet aluminum or steel similar to existing materials and roofing products, the channel is flexible to maintain a snug fit of the cable in the channel to maximize heat transfer and to allow for insertion and removal of the cable. This arrangement securely holds the cable in place to provide adequate heat transfer partially or entirely along any length of a roof-to-wall corner, wall-to-roof corner, or roof valley to prevent the development of ice dams and glacier type ice build-up which damages walls. The cable is partially visible for maintenance, inspections and replacement to conform to the NEC (National Electrical Code) Article 426. The channel is suited for existing recognized and widely used cable. The cable is mostly hidden from UV exposure.

Figure 18:
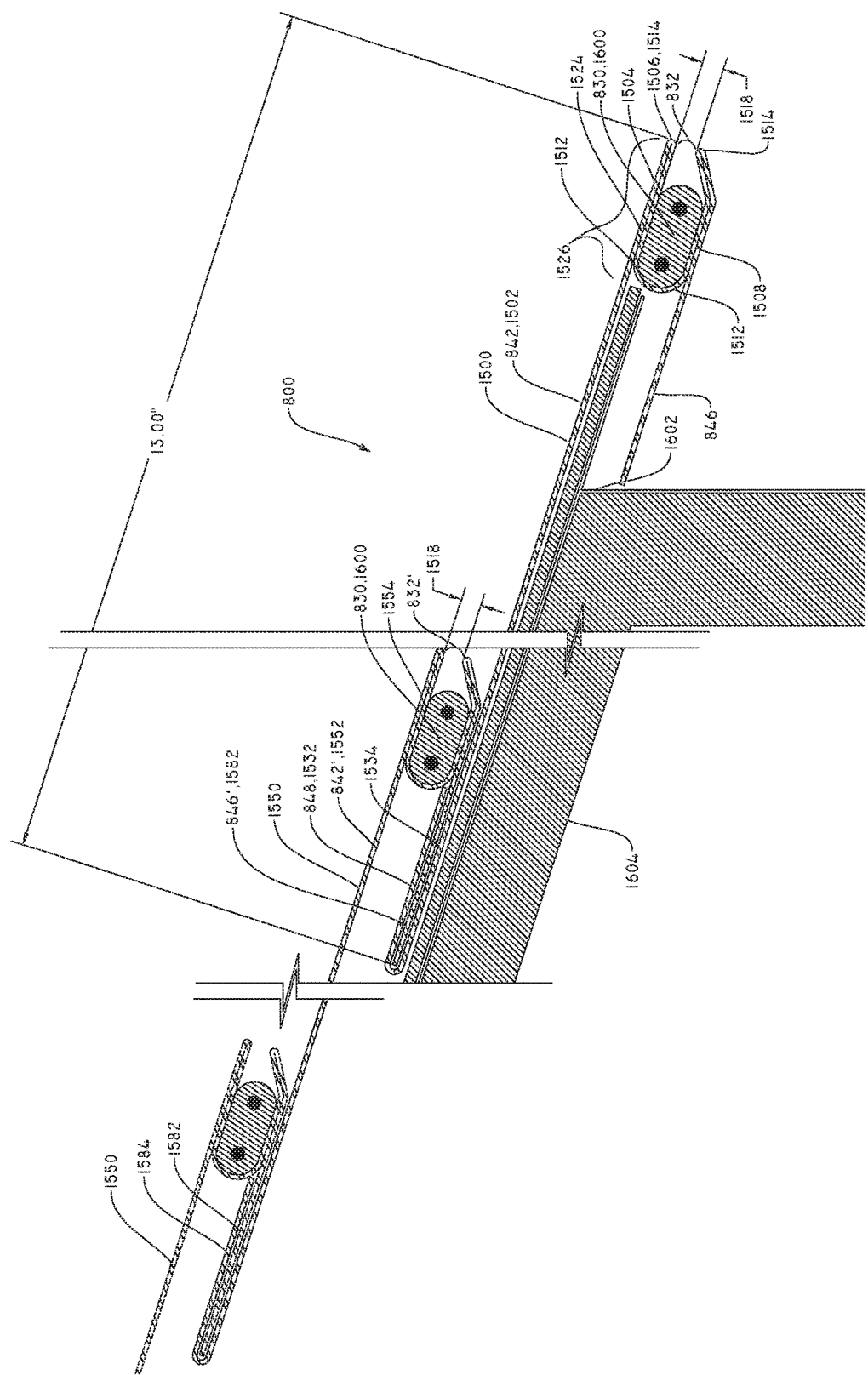
FIG. 18 is a cross-sectional view through an edge attachment according to a tenth embodiment.
Figure 19:
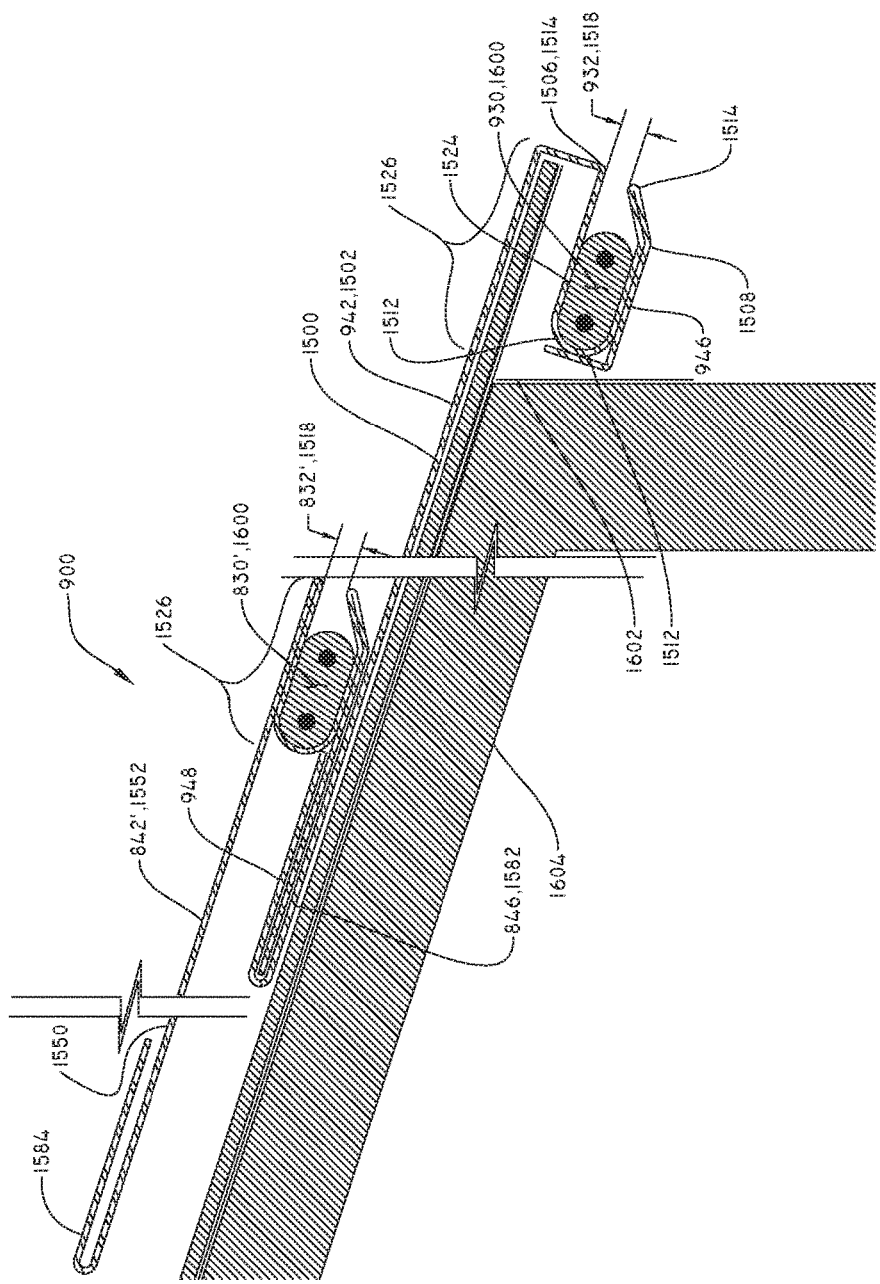
FIG. 19 is a cross-sectional view through an edge attachment according to an eleventh embodiment.
Figure 20:
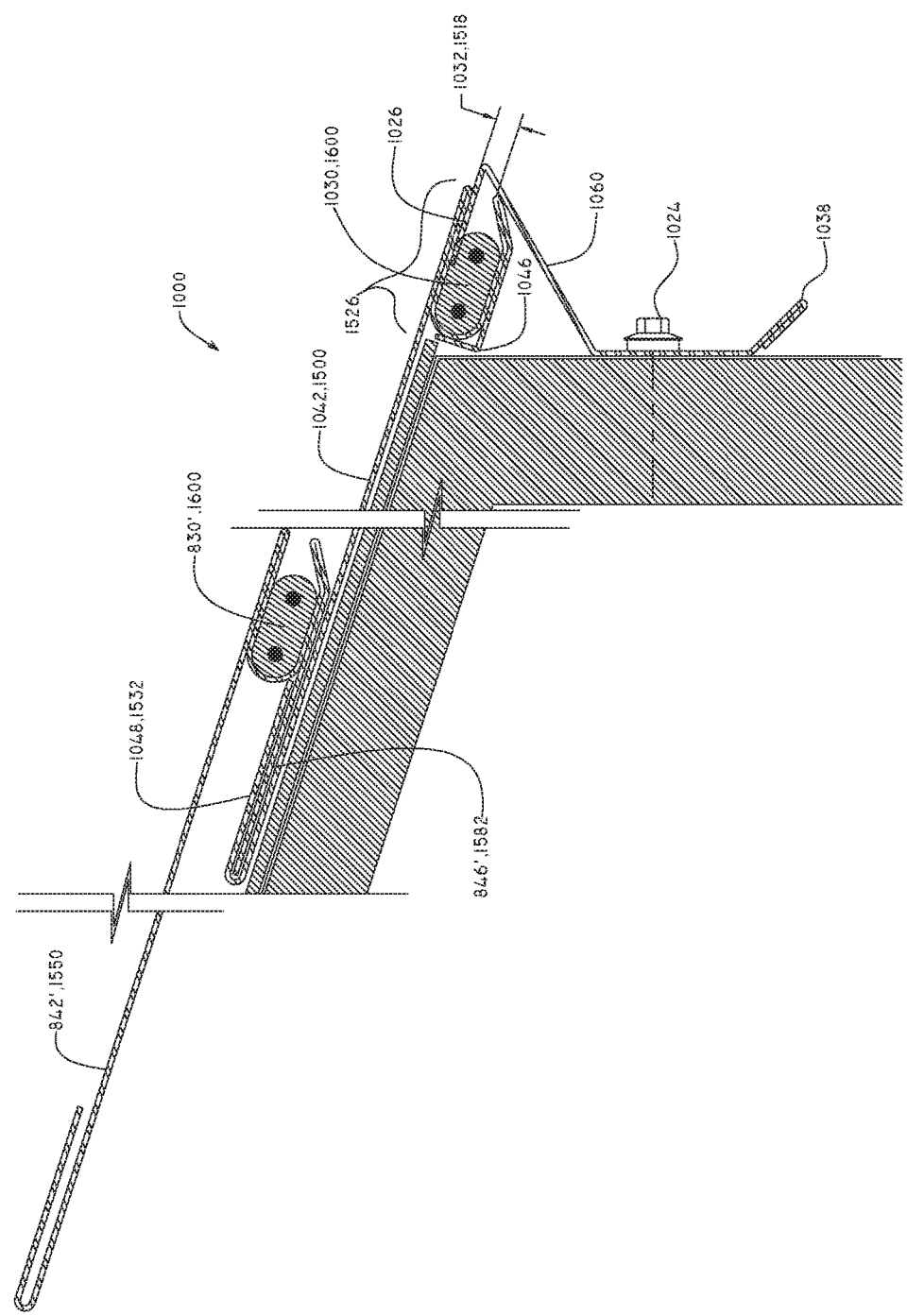
FIG. 20 is a cross-sectional view through an edge attachment according to a twelfth embodiment.

FIGS. 18-20 show various arrangements for securing two or more parallel runs of heating cable, one along the roof edge and one (or more) inboard there-from.

Referring first to FIG. 18, attachment arrangement 800 employs two or more overlapping and interlocking channel strips; edge strip 842 and upper strip 842'. Strips 842 and 842' may be identical to reduce inventory and manufacturing expense. Of course, more than one of upper strip 842' may be repeatedly added above the shown upper strip 842' to increase the number of parallel rows of heating cable in order to heat further up the roof from the roof edge. Edge strip 842 includes formed channel 832 at its lowest edge to snuggly, viewably, and replaceably receive the edge cable 830 as in the previous embodiments. And upper strip 842' includes formed channel 832' at its lowest edge to snuggly, viewably, and replaceably receive inboard cable 830' as in the previous embodiments. The overlapping allows rain to flow there-over to avoid wetting the roofing underneath. The interlocking of the strips by fitting the lower flange 846' of the upper strip into the upper fold 848 at the top edge of the edge strip enhances proper assembly and prevents the backflow of water by ice dams. Either both or else only the upper strip may be nailed to the roof. As in the previous embodiments, heat transfer is maximized because the cables are in constant contact snuggly against the strips. A built-in cavity is formed by lower flange 846 of the edge strip to receive an existing asphalt shingle, or the flange may be more firmly secured by additional fasteners in areas prone to high winds. The heat cable is partially visible for maintenance, inspections and replacement to conform to the NEC (National Electrical Code) Article 426. No modifications are required to existing roof decks. This one-piece design is easy to install onto asphalt shingles on the roof edge and around gutter hangers. It may also be easily used with other forms of siding or roofing, such as wood shake, cedar shingles, and concrete tiles. The interlocking lower flange into upper fold design is repeated in each additional row that may be desired.

FIG. 19 shows an attachment arrangement 900 similar to arrangement 800 of FIG. 18 except that the edge strip differs from the one of more upper strips to enable the edge heat cable 930 to be disposed below the overhanging edge and thereby protected from damage and so that icicles cannot develop on the roof edge. The other advantages of arrangement 800 are maintained and repeated.

FIG. 20 shows an attachment arrangement 1000 similar to arrangements 800 and 900 except configured to further protect edge cable 1030 from damage, such as from wind, by shield strip 1060. Flange 1026 is inserted into channel 1032 with and over cable 1030 and the shield strip is removably anchored to the fascia by screws 1024. The shield strip may be made of a more substantial material or thickness to provide protection from and support to ladders and other such dangers. Because the shield strip contacts the heating cable directly, icicle formation is prevented. The other advantages of the previous arrangements are maintained and repeated.

Figure 21:
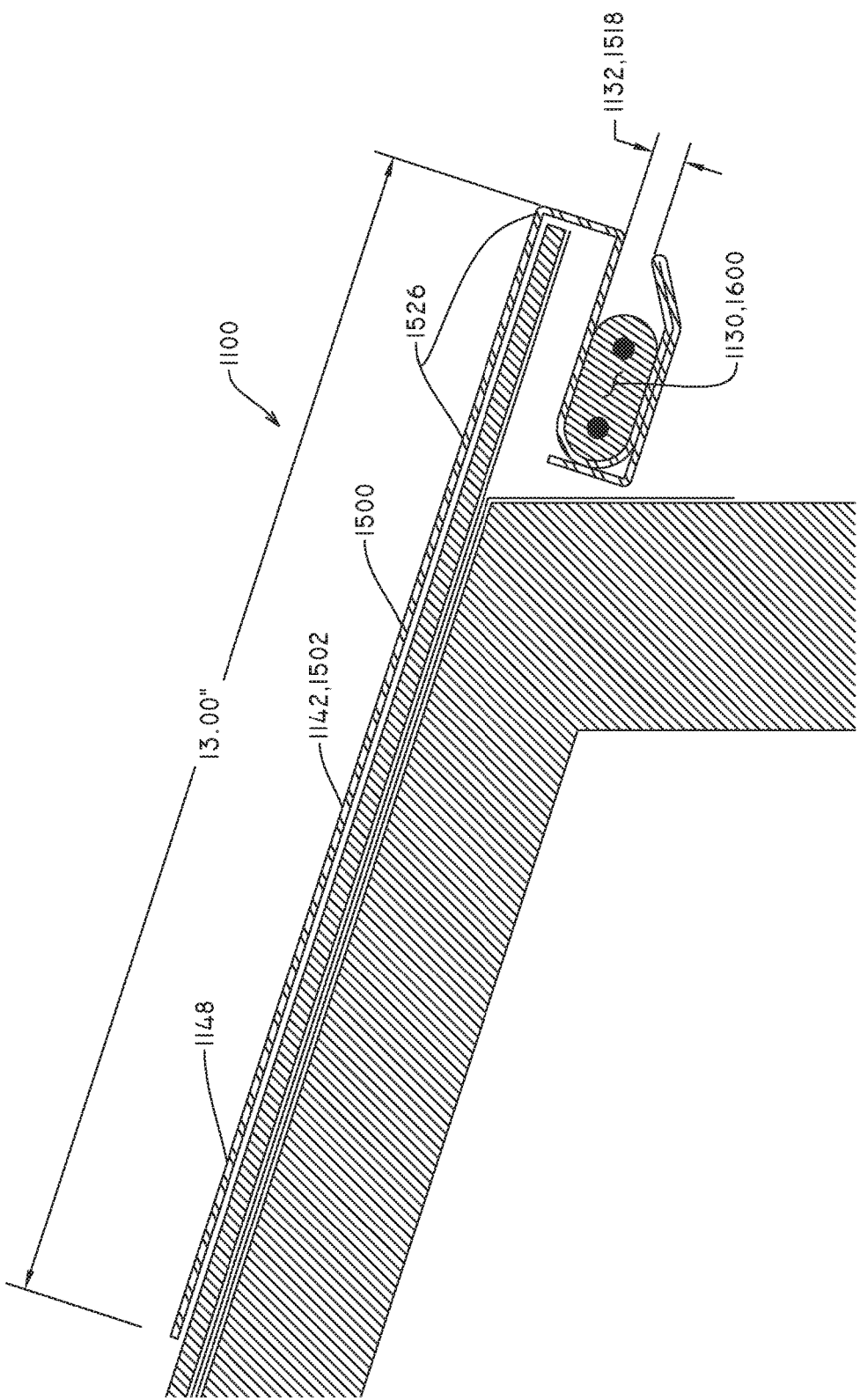
FIG. 21 is a cross-sectional view through an edge attachment according to a thirteenth embodiment.

FIG. 21 shows a single-cable arrangement 1100 having only a single edge strip 1142 constructed similarly to the edge strip 942 of multi-cable arrangement 900 excepting that its upper edge 1148 does not include or have reason for a fold. This design securely and removably holds a commercial grade self regulating heat trace cable 1130 in place within channel 1132 such that heat is transferred to the edge strip to prevent the formation of ice dams and icicles. The other advantages of the previous arrangement are maintained and repeated.

Figure 22:
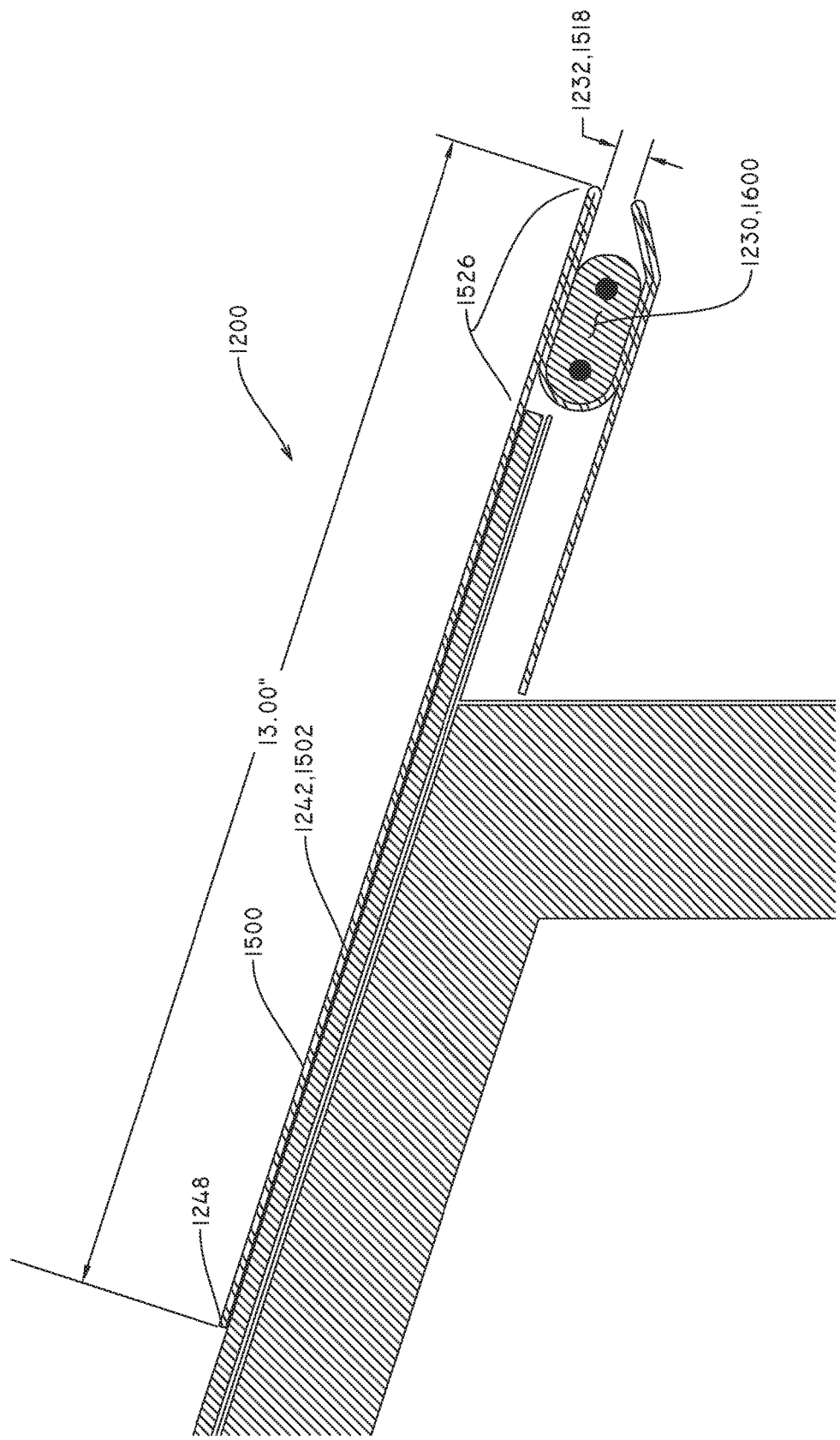
FIG. 22 is a cross-sectional view through an edge attachment according to a fourteenth embodiment.

FIG. 22 shows another single-cable arrangement 1200 having only a single edge strip 1242 constructed similarly to the edge strip 842 of multi-cable arrangement 800 excepting that its upper edge 1248 does not include or have reason for a fold. This design securely and removably holds a commercial grade self regulating heat trace cable 1230 in place within channel 1232 such that heat is transferred to the edge strip to prevent the formation of ice dams and icicles. The other advantages of the previous arrangements are maintained and repeated.

Figure 23:
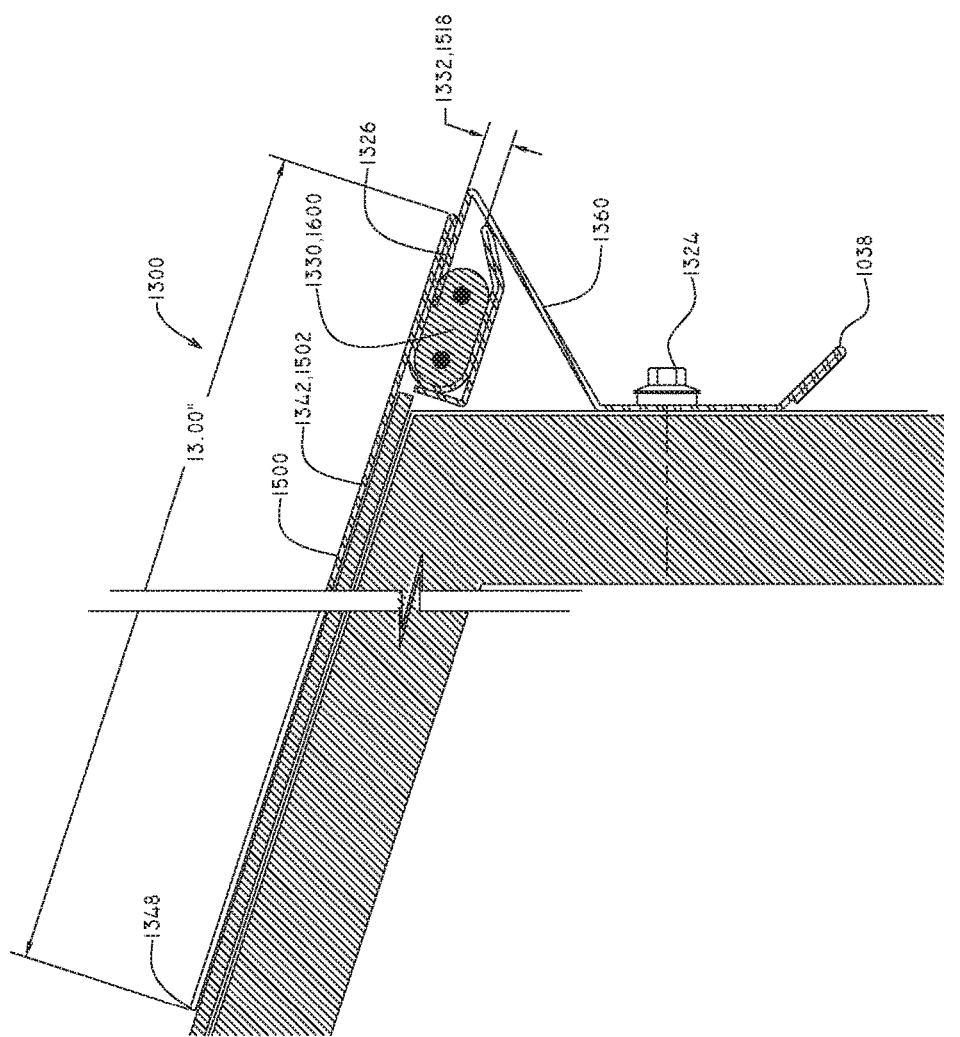
FIG. 23 is a cross-sectional view through an edge attachment according to a fifteenth embodiment.

FIG. 23 shows another single-cable arrangement 1300 having only a single edge strip 1342 and a shield strip 1360 configured to further protect edge cable 1330 from damage. The edge strip and shield strip are constructed similarly to the edge strip 1042 and shield strip 1060 of multi-cable arrangement 1000 excepting that the edge strip's upper edge 1348 does not include or have reason for a fold. Flange 1326 is inserted into channel 1332 with and over cable 1330 and the shield strip is removably anchored to the fascia by screws 1324. The other advantages of the previous arrangements are maintained and repeated.

Figure 24:
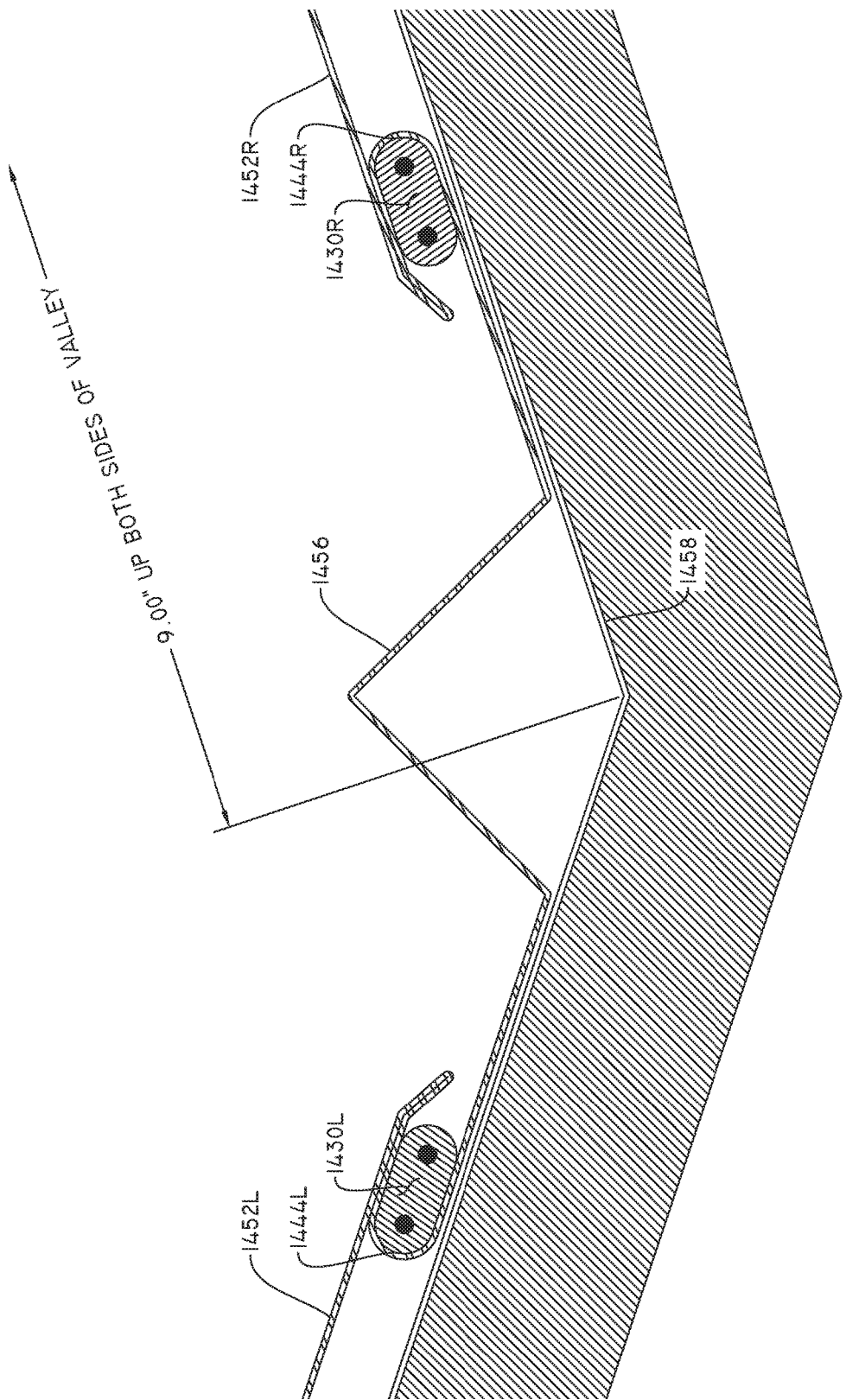
FIG. 24 is a cross-sectional view through a valley attachment according to a sixteenth embodiment.

FIG. 24 shows a roof valley double-cable raceway arrangement 1400. This design is used in cooperation with an existing roof valley flashing strip 1458 commonly used in the construction/building/roofing industry. Since roof valleys are so problematic in medium and high snow load regions, two raceways 1444R and 144L securely hold heat trace cables 1430R and 1430L, respectively, as in the previous embodiments, to provide adequate heat transfer throughout a roof valley to prevent ice dams from developing. The other advantages of the previous arrangements are maintained and repeated. The upper edges (not shown) of strips 1452R and 1452L do not include folds, but may be made to include interlocking folds such as were shown in the other embodiments in order to add additional upper strips such as those of the previous multi-cable embodiments.

An important feature common to various degrees among the arrangements of FIGS. 3 and 17-25 lies in the novel cable raceway channel. The channels are formed integrally from the sheet metal of at least one portion of the base device of each embodiment and includes numerous benefits;

- The formation of and from the base material saves cost and eliminates any seams or leak points, and optimizes heat conductance.
- The shape of the channel protects the cable from and enables the use of such otherwise-damaging implements as roof rakes to clear ice build-up that may have occurred such as during power outages.
- The construction of the channel provides a perfect balance between flexibility and rigidity . . . the flexibility ensuring that the cable may be repeatedly inserted through the channel's opening and removed for replacement and inspection, while the rigidity ensuring that the cable will be held firmly against and snuggly within the channel for maximum heat conductance.
- The material of the channel may be made of a single sheet of highly heat-conductive and non-corrosive material, such as aluminum.
- The shape of the channel and its opening allow the cable within to be seen so that it may be inspected for burned-out points or certain other types of damage without removal, yet the channel protects the cable from exposure to such damaging elements as sunlight and rain.
- The bending and shape of the channel allows for smooth and radiused edges to avoid damage to the cable during insertion.

Figure 25:
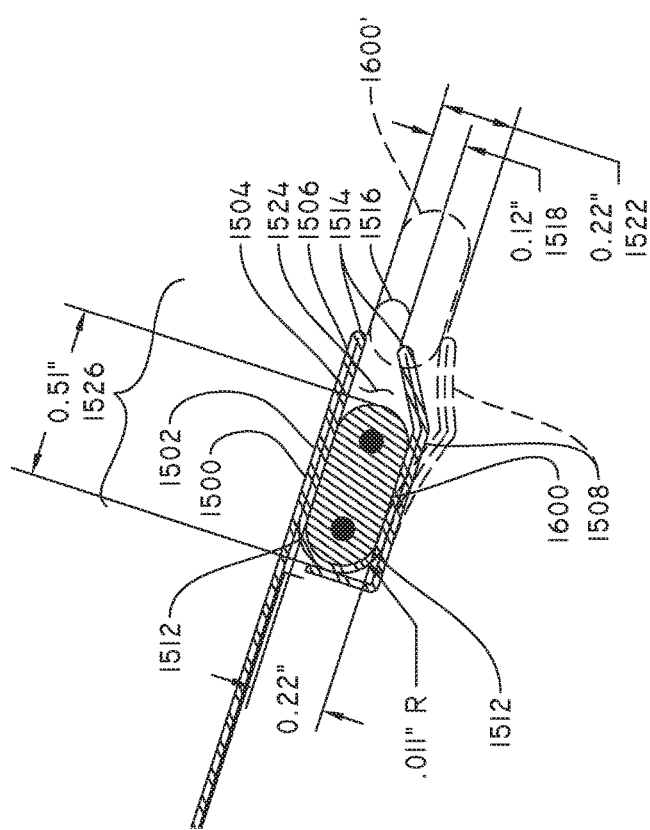
FIG. 25 depicts a simplified channel having elements common among the embodiments of FIGS. 13 and 17-24.

To appreciate that features and its benefits more clearly, attention is now returned to FIGS. 3, 17-24, and is directed more specifically to FIG. 25. In these various embodiments, some combination or all of these features and benefits are employed. The depicted embodiments, 60, 700, 800, 900, 1000, 1100, 1200, 1300, and 1400 are each a system that secures their respective heating cables within an integrally formed channel according to one or more aspects of the invention, which is depicted in a simplified form in FIG. 25. For this portion of the Description, common item numbers are used throughout those various figures.

Each embodiment is adapted to secure a common heating cable, such as but not limited to the aforementioned 120V Weather-Ready™ cable 1600, which has a cross-sectional shape that is best described as oblong, and is 0.51 inches wide by 0.22 inches high, with each short edge rounded at an approximate 0.11 inch radius. A cable may be substituted having a cross-sectional shape that is instead circular, rectangular, square, oblong, etc, so long as it is understood that the cross-section of the channel would be altered to appropriately conform.

Each embodiment includes an apparatus 1500 that includes a continuous metal base panel 1502 and a continuous metal C-shaped channel 1504 integrally-formed therewith. Preferably, the base panel and channel are integrally formed of a continuous length of 26-29 gauge aluminum sheet metal, but differing gauges or other materials such as galvanized steel sheet metal or copper sheet metal may be substituted with various effects on the heat-conductance, rigidity, weight, and cost of the apparatus that might be adjustable with dimensional modifications. Alternatively, the apparatus could be extruded, such as of aluminum.

The channel has a first continuous channel wall 1506 and a flexible second continuous channel wall 1508. The first and second channel walls may each have proximal ends 1512 and distal ends 1514, and may be integrally joined at their proximal ends and separated at their distal ends by a continuous gap 1516. The continuous gap may have an original gap width 1518 and an expanded gap width 1522.

The channel has a continuous internal cavity 1524 between the channel walls. The gap may be resiliently increasable from the original gap width to the expanded gap width by an outward flexing of the flexible second continuous channel wall to enable receipt of the cable 1600' there-through towards the continuous internal cavity 1524. For the exemplary cable, the original gap width is 0.12 inches, but this would vary according to the gauge and type of metal employed and the dimensions of the cable used. For the cable used herein, the expanded gap width is 0.22 inches, just wide enough to receive the 0.22 inch height if the forced-through cable 1600'. Then the channel walls spring back together to the original gap.

The continuous internal cavity 1524, having a height of 0.22 inches when the channel returns to the original gap width and a 0.11 inch radius joining the proximal ends, conforms snuggly around the received cable 1600 along the first and second continuous channel walls, 1506 and 1508, providing a maximal heat-conductance interface along the length of the cable.

The received cable 1600 is partially viewable from the exterior of the apparatus 1500 through the continuous gap 1516 for visual inspection. In those embodiments, 60, 800, 900, 1000, 1100, 1200, 1300, and 1400 used on sloped portions of a roof, where one of the channel walls overlies the cable, that wall of the C-shaped channel covers most of the received cable to protect it from sunlight exposure, and to protect it from the elements or external hazards, such as wetting by rain. That uppermost (overlaying) of the first and second channel walls of the channel is externally flat 1526 to prevent being snagged by a roof rake passing there-over from the proximal end toward the gap. The distal ends 1514 are without sharp corners or edges, either being folded over with a smooth rounding or continuing straight into the remainder of the apparatus, to avoid the risk of damaging the cable 1600' during insertion. Of course, any of the disclosed embodiments may be made with sharp corners or edges without departing from the invention.

FIGS. 3, 21, 22, 23, 26, and 27 show embodiments intended to secure a single length of cable 1600 along or near the lower horizontal edge 1602 of a portion 1604 of the roof. In these embodiments, the apparatus includes a continuous metal base panel 1502 and a continuous metal C-shaped channel 1504 integrally-formed with the continuous metal base panel and having a pair of opposing continuous channel walls, 1506 and 1508, creating and surrounding the continuous cavity 1524 having a cross-sectional cavity shape substantially identical for at least its majority to the cross sectional shape of the cable. The pair of channel walls are resiliently flexible to enable receipt of a continuous length of the heating cable within the continuous cavity such that the continuous length of the heating cable is in snug continuous contact with the continuous metal C-shaped channel along the majority to maximize heat conductance from the cable, through the channel, and to the base panel.

In these embodiments, the metal base panel is a continuous planar metal strip shaped to overlay a first portion 1604 of a sloped roof, including at least a portion of a lower horizontal edge 1602 of the roof. The continuous metal C-shaped channel is disposed along the lower horizontal edge of the roof when the metal base panel overlays the first portion of the sloped roof. These apparatus may also be continuously linearly formed or extruded, such as of aluminum.

FIGS. 18, 19, and 20 show embodiments intended to secure two (or cascaded additional) parallel lengths of cable 1600, the first along or near the lower horizontal edge 1602 of a portion 1604 of the roof and the second (or more) upslope thereof. This is accomplished by a second apparatus 1550 in addition to the previously described apparatus 1500, which will now be referred to as the "first" apparatus.

The second apparatus includes a second continuous metal base panel 1552 and a second continuous metal C-shaped channel 1554 integrally-formed therewith and otherwise similar to the first C-shaped channel 1504. The first apparatus has a continuous upper edge 1532 integrally-formed with the first metal base panel and disposed opposite the first metal base panel from the first continuous metal C-shaped channel, and the second apparatus has a continuous lower edge 1582 integrally-formed with and adjacent the second continuous metal C-shaped channel 1554.

The continuous upper edge of the first panel is folded-over to create an integrally-formed continuous receiving slot 1534 shaped to receive the flat upslope-directed continuous lower edge 1582 of the second panel. Less preferably, a downwardly-directed folded-over slot could be formed along the lower edge of the second apparatus and could receive a flat upper edge of the first apparatus.

Additional cascading of parallel cables up the slope of the roof may be accomplished by simply adding additional "second" apparatuses, provided the "second" apparatuses were folded-over to create a similar integrally-formed continuous receiving slot 1584 shaped to receive the flat upslope-directed continuous lower edge 1582 of the adjoining "second" panel.

Figure 26:
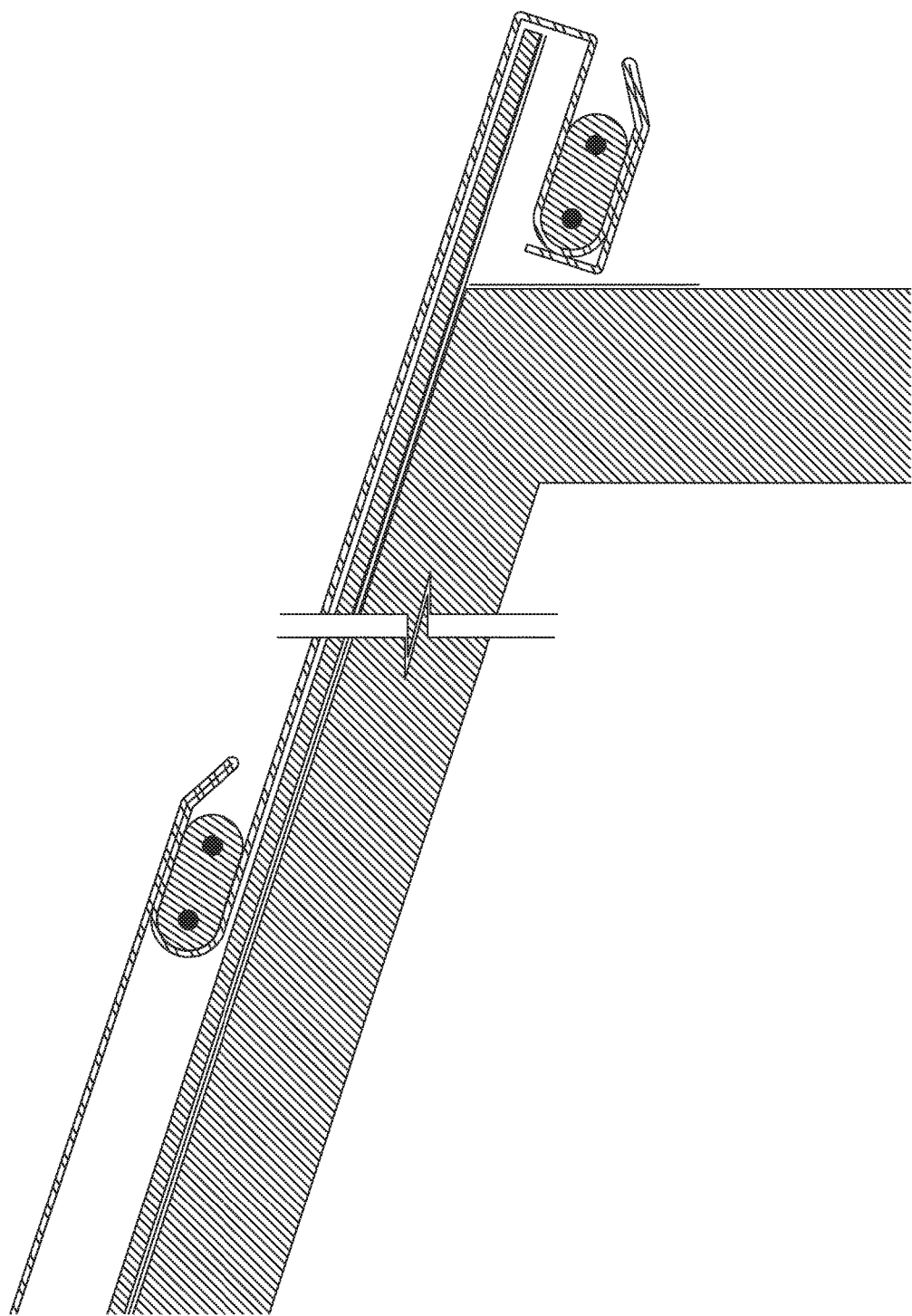
FIG. 26 is a cross-sectional view through an edge attachment according to a seventeenth embodiment.

FIGS. 26 and 27 show embodiments for securing multiple cables by a single apparatus having multiple of the channels. Shown are two channels in each embodiment for securing two cables, but additional channels and cables could be simply added if desired. These embodiments include features derived from the preceding embodiments, so for brevity, item numbering is not included in those figures by may be assumed from the other figures.

While the disclosed embodiments are shown of sheet metal and may be nailed in place similar to the way common drip edge is installed, an adhesive layer may alternatively be provided on the underside of the metal base to eliminate the need for nails or other such fasteners. The adhesive layer could be applied at manufacture and may have a cover of release paper that is removed just prior to installation.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed were meant to be illustrative only and not limited as to the scope of the invention which is to be given the full breadth of the appended claims and any equivalents thereof.

We claim:

1. A system for securing a cable to a roof, including an apparatus comprising:
   the cable;
   a metal base panel;
   a continuous metal C-shaped channel integrally-formed with the base panel and comprising a first continuous channel wall and a second continuous channel wall;
   the first and second channel walls each having proximal and distal ends, and being integrally joined at their proximal ends and separated at their distal ends by a continuous gap;
   the continuous gap having an original gap width and an expanded gap width;
   the channel having a continuous internal cavity between the channel walls;
   wherein the gap may be increased from the original gap width to the expanded gap width by an outward flexing of the second continuous channel wall to enable receipt of the cable into the continuous internal cavity and will return to the original gap width of its own resiliency after receipt of the cable;
   the second continuous channel wall further comprising a continuous bulge at its distal end directed towards the distal end of the first continuous channel wall; wherein the bulge narrows the width of the C-shaped channel at the distal end, to retain the cable therein;
   wherein the continuous internal cavity conforms around the cable along at least the first and second continuous channel walls.

2. The system of claim 1 wherein the cable is at least partially viewable from exterior of the apparatus through the continuous gap.

3. The system of claim 2 wherein the distal ends are radiused.

4. The system of claim 1 wherein the apparatus is continuously linearly formed in a single longitudinal piece.

5. The system of claim 1 wherein the apparatus is continuously linearly formed in a series of longitudinal pieces.

6. A system for securing heating cable to a roof, the heating cable having a cross-sectional cable shape, the system including an apparatus comprising:
   the heating cable;
   a metal base panel;
   a continuous metal C-shaped channel integrally-formed with the metal base panel and comprising a pair of opposing continuous channel walls creating and surrounding a continuous cavity having a cross-sectional cavity shape substantially identical for at least a majority thereof to the cross sectional cable shape; the pair of channel walls being resiliently flexible enough to enable stretching apart for receipt of a continuous length of the heating cable within the continuous cavity and automatic return of the channel walls to the cross sectional cavity shape such that the continuous length of the heating cable is in continuous contact with the continuous metal C-shaped channel along the at least a majority to enhance heat conductance from the continuous length of the heating cable to the metal base panel;

one of the continuous channel walls further comprising a continuous bulge at a distal end thereof and directed towards a distal end of the other continuous channel walls; wherein the bulge narrows the width of the C-shaped channel at the distal end, to retain the cable therein;

wherein the metal base panel is a continuous planar metal strip shaped to overlay a first portion of a sloped roof, including at least a portion of a lower horizontal edge of the roof, wherein the continuous metal C-shaped channel is disposed along the lower horizontal edge of the roof when the metal base panel overlays the first portion of the sloped roof; and wherein the cable is at least partially viewable from exterior of the apparatus.

7. The system of claim 6 wherein the apparatus is continuously linearly formed in a single longitudinal piece.

8. The system of claim 6 wherein the apparatus is continuously linearly formed in a series of longitudinal pieces.

* * * * *